United States Patent
Warke et al.

(10) Patent No.: US 12,122,091 B2
(45) Date of Patent: Oct. 22, 2024

(54) POROUS SINTERED METAL BODIES AND METHODS OF PREPARING POROUS SINTERED METAL BODIES

(71) Applicant: ENTEGRIS, INC., Billerica, MA (US)

(72) Inventors: Virendra Warke, North Chelmsford, MA (US); Meghan Patrick, Watertown, MA (US); Devon N. Dion, Tewksbury, MA (US); Subhash Guddati, Singapore (SG); Montray Leavy, Singapore (SG)

(73) Assignee: ENTEGRIS, INC., Billerica, MA (US)

( * ) Notice: Subject to any disclaimer, the term of this patent is extended or adjusted under 35 U.S.C. 154(b) by 81 days.

(21) Appl. No.: 17/151,010

(22) Filed: Jan. 15, 2021

(65) Prior Publication Data
US 2021/0221051 A1 Jul. 22, 2021

Related U.S. Application Data

(60) Provisional application No. 62/962,004, filed on Jan. 16, 2020.

(51) Int. Cl.
| | | |
|---|---|---|
| *B29C 64/153* | (2017.01) | |
| *B01D 67/00* | (2006.01) | |
| *B01D 69/06* | (2006.01) | |
| *B01D 71/02* | (2006.01) | |
| *B22F 7/02* | (2006.01) | |
| *B29C 64/268* | (2017.01) | |

(Continued)

(52) U.S. Cl.
CPC ...... *B29C 64/153* (2017.08); *B01D 67/00411* (2022.08); *B01D 67/00415* (2022.08); *B01D 69/06* (2013.01); *B01D 71/022* (2013.01); *B22F 7/02* (2013.01); *B29C 64/268* (2017.08); *B33Y 10/00* (2014.12); *B33Y 30/00* (2014.12)

(58) Field of Classification Search
CPC ....... B29C 64/153; B29C 64/268; B22F 7/02; B22F 2998/10; B22F 5/10; B22F 5/106; B22F 3/1121; B22F 10/14; B22F 1/10; B22F 3/002; B33Y 10/00; B33Y 30/00; B33Y 80/00; B33Y 70/00; B33Y 70/10; B01D 67/0041; B01D 69/04; B01D 69/06; B01D 71/022
See application file for complete search history.

(56) References Cited

U.S. PATENT DOCUMENTS

| | | |
|---|---|---|
| 5,749,041 A | 5/1998 | Lakshminarayan |
| 5,814,272 A | 9/1998 | Zeller |

(Continued)

FOREIGN PATENT DOCUMENTS

| | | |
|---|---|---|
| CN | 1478912 A | 3/2004 |
| CN | 102796909 A | 11/2012 |

(Continued)

OTHER PUBLICATIONS

Mohsen Ziaee, Materials and Methods to Fabricate Porous Structures Using Additive Manufacturing Techniques, USF Tampa Graduate Theses and Dissertations, 2018, https://digitalcommons.usf.edu/etd/8148.

(Continued)

*Primary Examiner* — John A Hevey

(57) ABSTRACT

Described are porous sintered metal bodies and methods of making porous sintered metal bodies by additive manufacturing methods.

13 Claims, 12 Drawing Sheets

(51) Int. Cl.
   *B33Y 10/00* (2015.01)
   *B33Y 30/00* (2015.01)

(56) References Cited

U.S. PATENT DOCUMENTS

| | | | |
|---|---|---|---|
| 9,327,448 | B2 | 5/2016 | Shah |
| 2004/0072010 | A1 | 4/2004 | Date |
| 2015/0125334 | A1 | 5/2015 | Jetani |
| 2015/0352639 | A1* | 12/2015 | Toyserkani ............. B28B 1/001 425/166 |
| 2016/0175929 | A1 | 6/2016 | Colin |
| 2016/0221083 | A1 | 8/2016 | Tuffile et al. |
| 2018/0021854 | A1* | 1/2018 | Fukada ................ B22F 1/00 428/546 |
| 2018/0065324 | A1 | 3/2018 | Isobe et al. |
| 2018/0071820 | A1 | 3/2018 | Natarajan |
| 2018/0280848 | A1* | 10/2018 | Hopkins ................ B01D 29/33 |
| 2019/0118264 | A1 | 4/2019 | Qi |
| 2021/0220914 | A1* | 7/2021 | Benn ....................... B22F 3/225 |

FOREIGN PATENT DOCUMENTS

| | | |
|---|---|---|
| CN | 108698123 A | 10/2018 |
| CN | 106825547 A | 1/2019 |
| CN | 109865838 A | 6/2019 |
| CN | 110049836 A | 7/2019 |
| CN | 110340359 A | 10/2019 |
| CN | 215879896 U | 2/2022 |
| CN | 109513940 A | 5/2022 |
| EP | 0627256 A1 * | 12/1994 |
| EP | 0707910 A2 * | 4/1996 |
| EP | 3473356 A1 | 4/2019 |
| EP | 4227026 A1 | 8/2023 |
| KR | 20180049284 A | 5/2018 |
| TW | 201929981 A | 8/2019 |
| WO | 2013167448 A1 | 11/2013 |
| WO | 2018106978 A1 | 6/2018 |
| WO | 2018208155 A1 | 11/2018 |
| WO | 2019009906 A1 | 1/2019 |
| WO | 2019025471 A1 | 2/2019 |
| WO | 2019126602 A2 | 6/2019 |
| WO | 2019219522 A1 | 11/2019 |
| WO | 2019221999 W | 11/2019 |

OTHER PUBLICATIONS

Hussain et al., Review of polymers for heat exchanger applications: Factors concerning thermal conductivity, Applied Thermal Engineering, vol. 113, pp. 1118-1127, 2017.

Tekce et al., Effect of Particle Shape on Thermal Conductivity of Copper Reinforced Polymer Composites, Journal of Reinforced Plastics and Composites, vol. 26, No. 1, pp. 113-121, 2007.

\* cited by examiner

POROUS SINTERED METAL BODIES AND METHODS OF PREPARING POROUS SINTERED METAL BODIES

CROSS-REFERENCE TO RELATED APPLICATIONS

This application claims the benefit under 35 USC 119 of U.S. Provisional Patent Application No. 62/962,004 filed Jan. 16, 2020, the disclosure of which is hereby incorporated herein by reference in its entirety.

FIELD

The described invention relates to porous sintered metal bodies and methods and compositions for forming porous sintered metal bodies by additive manufacturing methods.

BACKGROUND

Porous, sintered bodies find uses in a variety of industrial applications, including filtering of materials used in the electronics and semiconductor manufacturing industries, as well as other industries that require highly pure materials for processing. For example, in the semiconductor and microelectronics industries, in-line filters are often used to remove particulate matter from fluids to prevent introduction of the particulate matter into a manufacturing process. The fluid may be in the form of a gas or a liquid.

Currently, common methods of preparing porous sintered metal bodies commercially include forming and sintering steps that involve manually moving and handling intermediate (in-process) forms of a porous body. These steps are labor intensive. Moreover, the bodies are fragile and the forming steps can be imprecise. These features cause the methods to be prone to substantial waste, undesirably low efficiencies, and undesirably high costs.

SUMMARY

The present invention provides novel and inventive techniques and compositions for forming porous sintered metal bodies. The inventive methods do not suffer comparable inefficiencies and cost disadvantages of current techniques, but replace labor-intensive, less precise, potentially variable manual steps with a more precise, less labor-intensive additive manufacturing techniques that also have the advantage of being able to form parts of highly complex shapes.

The described processes are believed to be novel and inventive relative to current and previous additive manufacturing techniques for preparing other types of metal structures. Previous additive manufacturing methods for preparing metal parts are designed to produce metal body end parts that have a low porosity, e.g., solid metal bodies having a porosity that is below 10 percent. In contrast, the present invention is specifically designed and intended to produce metal bodies of substantial or high porosity, e.g., at least 50 percent porosity. Example processes can produce a finished porous sintered metal body having a porosity in a range from 50 to 80 percent. To successfully perform processing in this manner, it has been determined that particles used to form the sintered porous body can be selected to exhibit a low "relative apparent density," which can be a function of the form (e.g., shape) of the particles.

In one aspect, the invention relates to a method of forming a porous sintered metal body by additive manufacturing steps. The method includes: forming a layer on a surface, the layer comprising feedstock that contains metal particles; at portions of the layer, selectively forming solidified feedstock comprising the metal particles and solid polymer, the portions containing from 20 to 50 percent of the metal particles by volume; forming a second layer over the layer that contains the solidified feedstock, the second layer comprising feedstock that contains metal particles; at portions of the second layer, selectively forming solidified feedstock comprising the metal particles and solid polymer, the portions containing from 20 to 50 percent of the metal particles by volume; and sintering the metal particles of the portions to form a porous sintered metal body containing from 20 to 50 percent metal particles by volume.

In another aspect, the invention relates to feedstock that contains: from 50 to 80 percent by volume curable, liquid polymeric binder; and from 20 to 50 percent by volume metal particles having a relative apparent density in a range from 5 to 35 percent of a theoretical density of the particles, based on total volume of the feedstock composition.

In yet another aspect the invention relates to feedstock that contains: solid pore-forming polymer particles, and from 20 to 50 percent by volume metal particles having a relative apparent density in a range from 5 to 35 percent of a theoretical density of the particles, based on total volume of the feedstock composition.

In yet another aspect, the invention relates to a porous sintered metal body formed by an additive manufacturing method, the body containing sintered metal particles and having a porosity in a range from 50 to 80 percent.

DETAILED DESCRIPTION

Figure 1A:
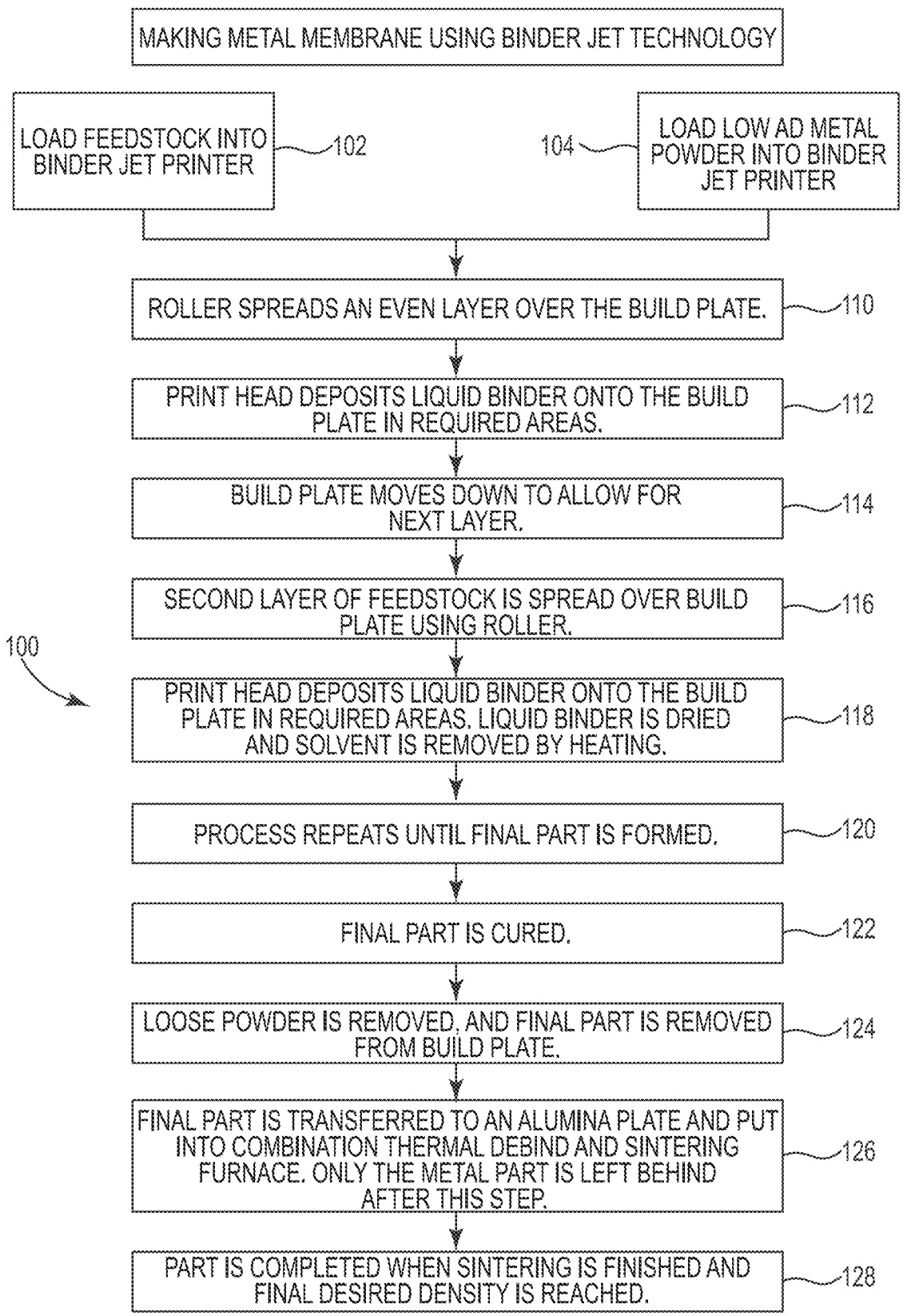
FIGS. 1A, 1B, 2A, 2B, 3A, and 3B shows example steps of a method as described of forming a porous sintered metal body by additive manufacturing techniques.

According to the following description, porous sintered metal bodies (including but not limited porous sintered membranes useful as filter membranes) are prepared by additive manufacturing methods, including those commonly referred to as "three-dimensional printing" ("3D printing") techniques. Different varieties of additive manufacturing techniques are known. To name just a few specific examples, some particular varieties are referred to as "binder jet printing," "stereolithography," and "selective laser sintering." Methods and compositions of the present description will be described in terms of these three exemplary varieties. Additionally, however, the described methods and compositions are understood to be useful generally with other additive manufacturing techniques in addition to the specified "binder jet printing," "stereolithography," and "selective laser sintering" examples.

The described methods involve additive steps that individually and sequentially form multiple layers of solidified feedstock that contains metal particles dispersed in solid polymer. Using a series of additive steps, the multiple layers of solidified feedstock are formed into a multi-layer composite made from multiple layers of solidified feedstock, each layer formed separately. The multi-layer composite contains metal particles dispersed and held in place together by the solid polymer. The multi-layer composite can optionally be processed to cure or further harden the solid polymer. In any desired order, or in a single step, the solid polymer may be removed from metal particles, and the metal particles may be processed by a sintering step at a sintering temperature to cause the metal particles to form an interconnected porous metal particle matrix, i.e., a porous sintered metal body. The resultant porous sintered metal body comprises (or consists of or consists essentially of) a solid (e.g., rigid or semi-rigid) matrix of fused and thereby interconnected metal particles. The matrix is porous (e.g., highly porous), with the particles of the matrix having become connected together at adjacent surfaces during a sintering step.

The porous sintered metal body can have a high porosity, particularly relative to previous metal structures prepared by additive manufacturing techniques. Example porous sintered metal bodies can be prepared to have a porosity that is effective for the metal body to be used as a filter for removing particles or other contaminants from a very high purity fluid (e.g., gas or liquid), such as a fluid that is used to manufacture electronic devices, microelectronic devices, or semiconductor materials. Example porosities may be at least 50 percent, e.g., in a range from 50 percent up to or excess of 60, 70, 75, 80, or 85 percent by volume.

As used herein, and in the art of porous bodies, a "porosity" of a porous sintered metal body (also sometimes referred to as "void fraction") is a measure of the void (i.e. "empty") space in the body as a percent of the total volume of the body, and is calculated as a fraction of the volume of voids of the body over the total volume of the body. A body that has zero percent porosity is completely solid.

A related measurement of a porous body of the present description or a precursor thereof (e.g., a "solidified feedstock" that exists during a series of additive manufacturing steps), is the amount by volume of metal particles in a composition or structure. An amount of metal particles per volume of a structure or composition is a percent, by volume, of metal particles in the composition or structure per the total volume of the composition or structure; the portion of the total volume of the composition or structure that does not contain metal particles may (or may not) contain another material such as polymer used during an additive manufacturing step (e.g., polymer of a feedstock or a binder) in any form (e.g., solid, liquid, cured, uncured). For a finished porous sintered metal body (with an assumption of no residue remaining on surfaces of the porous sintered metal body), the value of the porosity (in percent) of the sintered body plus the value of the percent volume of metal particles of the sintered body is 100 (percent).

The porous body can be in a form of a membrane that may have any useful form and shape, e.g., a form of a flat sheet, e.g., a substantially planar, essentially two-dimensional (having a very small thickness) single piece flat sheet or membrane. However, additive manufacturing techniques can be applied to the formation of porous sintered metal bodies to allow for an extremely wide range of new possible shapes and forms that were not possible when using previous methods for preparing porous bodies.

Using additive manufacturing, nearly any two-dimensional or three-dimensional shape may be formed. A porous metal body may, as is conventional, be made of a single integral structure having nearly any conceivable two-dimensional or three-dimensional shape. Or, by using additive manufacturing techniques, a porous metal body may now include multiple pieces, also of any desired shape, that are interconnected, for example are entwined, woven, wound, spiraled, linked, or folded, etc. For use as a filter membrane, common shapes include: a curved or rounded plate or "cup"; an annulus such as a tube having a round or circular cross-section when viewed along an axis of the tube, e.g., a cylinder or cylinder-like tube; a "closed cylinder," which is a tube with any cross section having one open end and one closed end; a tube (cylinder or closed cylinder) having a non-circular shape in cross section, such as a shape that includes angles, corners, or a pleated pattern (multi-pointed star, or a circular "zig-zag" pattern).

A porous sintered metal body for use as a filter (of any shape) may typically include two opposed major surfaces and a thickness between the two opposed major surfaces, through which a fluid flows during a filtering step. A thickness of example metal bodies used as a filter membrane (e.g., a thickness of a disk or cup, or a thickness of a body wall of a tube or cylinder) can be in a range that is effective for use of the porous body as a filter, e.g., that results in desired flow properties such as sufficient flow at a given pressure drop, and filtering properties such as particle retention, while having sufficient strength and structural integrity to be handled, installed, and used as part of a filter system. Examples of useful thicknesses may be in a range from 0.5 to 5 millimeters, e.g., from 1 to 4 millimeters.

As described herein, a porous sintered metal body is formed by an additive manufacturing technique. Additive manufacturing techniques are generally known for use in producing various structures such as non-porous polymeric and metal or metal-containing structures. Typically, porosity of a structure formed by an additive manufacturing method is undesired. A typical goal is to avoid pores in a finished part produced by additive manufacturing, including for metal parts. Consistent with a typical interest in avoiding pores, it is not believed that any additive manufacturing method being used previously for forming a porous sintered metal body of the type described herein, such as a porous sintered metal body that may be useful as a filter membrane for filtering a fluid to a very high purity for use in electronic device, microelectronic device, or semiconductor materials manufacturing. Considered in alternate terms, it is not believed that the use of additive manufacturing was previously used for forming porous sintered metal bodies having a high porosity (void fraction), such as a porosity that is greater than 50 percent.

Methods of forming a porous metal body by additive manufacturing steps can involve, in general terms, a sequence of multiple individual steps, each step being used to form a single cross-sectional layer of a porous metal body, with the multiple steps in sequence being effective to form a porous sintered metal body that is a multi-layer composite of the solidified feedstock of cross sectional layers prepared by each step, i.e., a multi-layer porous sintered metal body. Each step may include: forming on a surface a single feedstock layer that includes feedstock that contains metal particles and optional polymer; and, subsequently, selectively forming solidified feedstock at selected portions of the feedstock layer, the solidified feedstock comprising metal particles of the feedstock, and solid polymer. To produce a porous metal body, the solidified feedstock can preferably include an amount of metal particles that is below 50 percent based on volume, e.g., an amount of metal particles in a range from 20 to 50 percent metal particles based on total volume of the solidified feedstock.

As used herein to calculate percent volume of metal particles in a composition or structure, the total volume of the composition or structure is taken as the nominal or "bulk" volume of the composition or structure. For example, as part of a feedstock layer a portion of a feedstock layer that is solidified feedstock, total volume of the feedstock layer is the total area of the layer multiplied by the thickness of the layer, and total volume of a solidified feedstock of a feedstock layer, is the area of the solidified feedstock portion of the feedstock layer, multiplied by the thickness of the feedstock layer.

The feedstock layer may be formed on a surface by any useful process or equipment. By one example of applying a powder feedstock to a surface, a roller uniformly applies an amount of powder feedstock over a surface either by applying a single amount of powder feedstock in a single pass, or by applying multiple separate amounts of powder feedstock with multiple passes over the surface. The "feedstock layer" may be formed by one or multiple steps of applying feedstock to the surface and using a roller or other application method to form a smooth, uniform feedstock layer having a desired and useful depth. A useful depth of a feedstock layer can depend on the resolution of a printhead used to apply binder to the feedstock layer. As a single non-limiting example, a printhead having a resolution of 100 microns may be used with a feedstock layer of approximately 10 microns.

The solid polymer of solidified feedstock may be derived from polymeric material (which includes oligomeric or monomeric materials that are polymerizable) that is initially present in the feedstock layer formed on a surface. In alternate methods, the solid polymer may instead be derived from polymeric material that is added to the layer in a separate step performed after the feedstock layer has been formed on a surface but before a subsequent feedstock layer is applied on top of the feedstock layer.

Multiple successive steps of forming each single feedstock layer using feedstock that contains metal particles, followed by selectively forming solidified feedstock at a portion of each individual feedstock layer, with each successive new feedstock layer (other than the initial feedstock layer) being formed on top of a previous feedstock layer that contains solidified feedstock, produces a multi-layer solidified feedstock composite that is a composite of the portions of solidified feedstock formed at each individual feedstock layer. The multi-layer solidified feedstock composite will be situated within a mass of original feedstock that has not been formed into solidified feedstock and that may subsequently be separated from the multi-layer solidified feedstock composite.

The multi-layer solidified feedstock composite (or "multi-layer composite" for short) includes multiple individually-formed layers of solidified feedstock, each layer being in contact with one or more adjacent layers of solidified feedstock, and each layer of solidified feedstock being an individual amount of solidified feedstock formed using one of the feedstock layers deposited onto a surface. The multi-layer composite includes one layer formed during each individual step of: forming a feedstock layer that contains metal particles, on a surface; and forming solidified feedstock at a portion of the area of the feedstock layer, the solidified feedstock containing metal particles from the feedstock layer, and solid (e.g., cured, hardened, dried, or the like) polymer.

Feedstock used to form a layer on a surface contains the metal particles and may also optionally contain (in combination with the metal particles) one or more polymers. A polymer as part of feedstock may be effective to perform any one or more of various functions, and may be in any of a variety of useful forms, e.g.: a form of a polymer coating on surfaces of metal particles; as solid polymer (e.g., thermoplastic) particles that are separate from the metal particles; or as curable (e.g., by electromagnetic radiation such as UV light) liquid polymer within which the metal particles are distributed and suspended as part of the feedstock.

One possible purpose of polymer in a feedstock is to separate and produce space between metal particles of feedstock and of a feedstock layer that is deposited on a surface. Sometimes referred to as "pore-forming polymer particles," these solid polymeric particles are in solid form as part of a feedstock, and can act to physically separate metal particles within the feedstock and within a feedstock layer to produce space between the metal particles of the feedstock layer and distribute the metal particles with desired levels of spacing and uniformity throughout the feedstock layer. The pore-forming polymer particles facilitate formation of a feedstock layer or solidified feedstock layer that contains metal particles distributed within each, with the metal particles being present at a desired low volume percent relative to the volume of the feedstock layer or solidified feedstock layer, e.g., a preferred feedstock layer and solidified feedstock layer may contain less than 50 percent metal particles based on volume. Feedstock in the form of a powder that contains metal particles and polymer particulates may additionally include minor ingredients such as flow aids, dispersants to prevent particle agglomeration, etc.

Pore-forming polymer particles can be of any useful polymer composition (e.g., thermoplastic, and may be of size that will be useful in combination with metal particles of a feedstock. Sizes of pore-forming particles may be in a range of sizes also useful for metal particles of feedstock, such as on a scale of microns, e.g., having an average size of less than 100 microns, less than 100 microns, less than 50 microns, 10 microns, or less than 20 microns, for example in a range from 1 to 20 microns.

Another type of polymer that may be included in a feedstock can be polymer that is present as a solid coating on surfaces of metal particles of the feedstock. This polymer may be a thermoplastic polymer that is useful to be reversibly melted and solidified to selectively (i.e., over a portion of an area of a layer) produce a connective polymeric matrix made of the melted and solidified polymer, that connects the metal particles of the feedstock layer to form solidified feedstock made of the solid polymer and the connected metal particles. This type of polymeric coating on surfaces of metal particles of a feedstock can be selectively and reversibly melted and re-hardened at portions of a feedstock layer to produce a structural connection with the polymer, between adjacent metal particles, to fix positions of the metal particles relative to adjacent metal particles within solidified feedstock as described herein.

Yet another type of polymer that may be included in a feedstock that contains metal particles can be curable liquid polymer (sometimes referred to as a "binder"). The feedstock is a liquid that contains metal particles dispersed (preferably uniformly) throughout the curable liquid polymer. The feedstock can be formed into a liquid feedstock layer on a surface and then cured in a selective manner relative to the total area of the feedstock layer. For example, portions of curable liquid polymer of a layer may be selectively (at selected areas of the layer) cured (solidified) by exposing the liquid polymer to electromagnetic energy, such as from a laser, e.g., a UV laser. Selectively curing curable liquid polymer at a portion of the feedstock layer produces solidified feedstock that includes a mass of solid (cured) polymer that surrounds the metal particles. The solid polymer fixes positions of the metal particles of the solidified feedstock relative to adjacent metal particles. The curable liquid polymer also facilitates formation of a feedstock layer and solidified feedstock (as a portion of the feedstock layer) that contain metal particles distributed within the feedstock layer and the solidified feedstock at a desired low volume percent, e.g., the feedstock layer or the solidified feedstock may preferably contain less than 50 percent metal particles based on total volume of the feedstock layer or the solidified feedstock, respectively.

Curable liquid polymer (binder) can include curable polymeric material which may contain oligomers, polymers, etc., and may normally additionally contain minor amounts of functional ingredients or additives that allow for or facilitate flow or curing of the polymer. These may include any of: a flow aid, a surfactant, an emulsifier, a dispersant to prevent particle agglomeration, and an initiator to initiate cure of the polymer when exposed to electromagnetic (e.g., ultraviolet) radiation.

An additive manufacturing process as described uses multiple successive steps of forming individual feedstock layers, one layer per step, with each layer except for a first layer being formed over a previous layer that contains the feedstock and solidified feedstock. Each successive feedstock layer is processed to form solidified feedstock at a portion of the feedstock layer. Successive layers are subsequently applied and processed to form solidified feedstock until a desired number of feedstock layers with solidified feedstock are formed. The individual layers that are formed by the series of steps, each layer having a portion that is solidified feedstock, forms a multi-layer solidified feedstock composite (or simply "solidified feedstock composite") that is a composite of the individual layers of solidified feedstock formed at each individual feedstock layer. The multi-layer solidified feedstock composite will be present within and amongst an amount of original feedstock that has not been processed to solidified feedstock.

Based on the present description of using additive manufacturing steps generally to prepare interconnected metal bodies and porous sintered metal bodies from metal particles, it is contemplated herein that such bodies may be prepared by using a very wide range of different types of additive manufacturing steps, methods, techniques, and related polymers and compositions, including those that are described herein, others that are presently known and understood, as well as useful steps, methods, compositions, and techniques that are developed in the future and are consistent with any described herein either generally or specifically. Specific and non-limiting examples of additive manufacturing techniques that are known at present and that are contemplated for use according to the present description include additive manufacturing techniques sometimes referred to as: binder jet printing, stereolithography (SLA), and selective laser sintering (SLS).

The technique referred to as binder jet printing (also known as "Powder bed and inkjet" printing, "binder jet 3D printing," and "Drop-On-Powder printing," and the like), like other additive manufacturing techniques is a method for making objects described by digital data such as a CAD (computer-aided design) file. Also like other additive manufacturing processes, a three-dimensional body is sequentially built up by a series of individual steps that combine to produce a composite body ("solid body composite," herein) made of many thin cross sectional layers ("solidified feedstock" of a "layer," herein) of the three-dimensional structure. A print head moves across a layer of feedstock, which according to the present invention contains metal particles. The print head selectively deposits liquid polymer ("binder," herein) at portions of the top surface of the feedstock layer. The liquid polymer flows into the feedstock layer and is dried or otherwise solidified to form solidified feedstock at portions of the layer. The solidified feedstock contains the metal particles and solidified (e.g., dried) polymer formed from the applied liquid polymer.

An additional thin layer of the feedstock is spread over the top surface of the completed layer, which contains original (non-solidified) feedstock, and solidified feedstock.

The process is repeated with each layer being formed on and adhering to a previous layer. Multiple feedstock layers are deposited, successively, one over each completed layer, to form a multi-layer solidified feedstock composite that contains each layer of solidified feedstock. After all layers of the multi-layer solidified feedstock composite have been deposited, areas of the layers that contain original feedstock that has not been used to prepare solidified feedstock are separated away from the multi-layer composite. The multi-layer composite can subsequently be processed by a curing step to cure (e.g., crosslink) the liquid binder using elevated temperature, a debind step to remove the cured polymer of the liquid binder, and a sintering step to cause metal particles of the composite to be fused together to form a sintered porous metal body.

The debind step and the sintering step may be performed in a single apparatus (e.g., oven or furnace) or may be performed in a sequence of the debind step in a first apparatus, with a subsequent sintering step being performed in a second (different) apparatus. A temperature used for a debind step is lower than a temperature used for a sintering step. A temperature for a debinding step may normally be in a range below 600 degrees Celsius, for example in a range from 100 to 550 or 600 degrees Celsius. A temperature selected of any particular debind step, of a particular multi-layer composite, can depend on the chemistry of the binder. A temperature for a sintering may be generally higher than a temperature for a debinding step, e.g., greater than 550 or 600 degrees Celsius.

According to example methods and compositions, feedstock used for a binder jet printing method may optionally and preferably contain solid polymer along with the metal particles. The solid polymer may be a thermoplastic (in solid form at room temperature) pore-forming polymer, and may be present in the feedstock in any amount, such as in an amount of from 0.5 to 15 weight percent based on total weight feedstock, e.g., from 1 to 12 or from 2 to 10 weight percent based on total weight feedstock, with the balance of the feedstock (by weight) being metal particles.

Figure 1B:
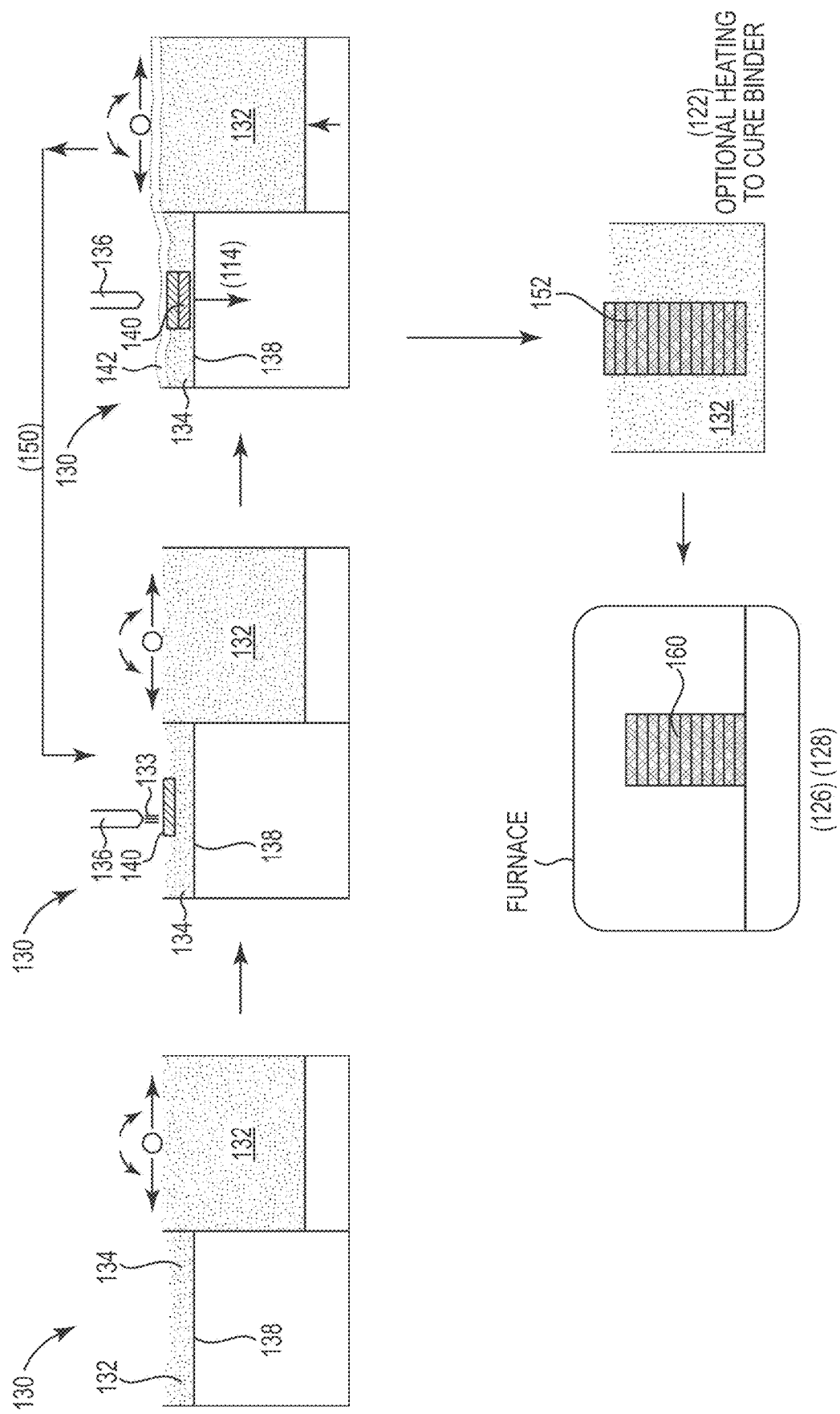

Examples of a binder jet printing additive manufacturing technique (100) useful for preparing a porous sintered metal body are shown at FIGS. 1A and 1B. FIG. 1A illustrates a sequence of steps of a useful jet printing additive manufacturing technique, and identifies that the method can be used, independently, with different forms of feedstock 102 and 104. Feedstock 102 is a powder that contains metal particle powder in combination with solid thermoplastic polymer (e.g., polymethylmethacrylate, "PMMA," of another thermoplastic polymer) pore-forming particle beads, as well as polymer coated onto the beads and the metal particles (e.g., a solvent-coated thermoplastic polymer). Feedstock 104 is a powder that contains metal particles in combination with polymeric pore-forming particles beads, but without any polymer coating on the beads or metal particles. FIG. 1B schematically illustrates steps of technique 100 with related process equipment and feedstock.

The process can be performed using commercially available binder jet printing apparatus, thermoplastic polymer (of the feedstock), and with liquid polymeric binder dispensed from a printhead of the apparatus. According to example steps of the method (FIG. 1, with steps numbered parenthetically), feedstock (102 or 104) is formed as an even feedstock layer of desired depth, over a build plate of the apparatus (110). In a subsequent step (112), a print head selectively deposits liquid polymer binder onto a portion of the first layer. The liquid polymer binder contains polymer in a liquid solvent. After the liquid polymer binder is selectively applied to the feedstock layer, the liquid polymer binder can be solidified by applying heat to the liquid polymer binder to remove solvent from the binder and form solidified feedstock at the portion.

The liquid binder is applied to the feedstock layer in an amount that is effective to fix the positions of the metal particles and optional pore formers of the feedstock layer. The liquid binder is not required to fill the spaces between metal particles or pore formers of a powder feedstock, but may be applied in an amount that connects or "bridges" adjacent or nearby particles in the powder feedstock layer to cause the positions of the particles to be fixed relative to the others, without necessarily filling the void space of the feedstock layer. The "solidified" feedstock is "solid" in a sense of being stiffened, rigid, or hardened, i.e., made of cured or dried (non-liquid) polymer, but may be porous.

Portions of the layer that are not formed to solidified feedstock remain as the original powder feedstock. The build plate is moved down (114) and a second layer of the feedstock is formed (116) as a second even layer over the first layer and the first solidified feedstock. The print head then selectively deposits a second amount of the liquid polymeric binder onto portions of the second layer (118) and the second amount of the liquid polymeric binder is solidified to form solidified feedstock from the second layer by using heat to remove the solvent and form dry (solidified) polymeric binder. Portions of the second layer that are not formed to solidified feedstock remain as the original powder feedstock. Steps 114, 116, and 118 are repeated (120) to form a completed multi-layer solidified feedstock composite ("final part") surrounded by the original powder feedstock (102 or 104). The multi-layer solidified feedstock composite is a body that contains the solidified feedstock of each formed layer, and is composed of the metal particles dispersed in the solidified (solid) polymer binder. Optionally, the multi-layer solidified feedstock composite, optionally in the presence of the surrounding original powder feedstock, can be heated to crosslink and cure the liquid polymeric binder (122). The original (loose) powder feedstock (102 or 104) can be removed and separated from the multi-layer composite (124). The multi-layer composite can be moved to a furnace for heating to a sintering temperature (126) that will be effective to remove solidified binder (debind) and to cause the metal particles of the multi-layer composite solid be fused to form a final porous sintered metal body having a desired final density (128).

Referring to FIG. 1B, an example process can be performed using commercially available binder jet printing apparatus (130), feedstock (132) as described herein, and liquid polymeric binder (133) dispensed from a printhead (136) of the apparatus (130). According to example steps of the method, feed stock (132) is formed as an even feedstock layer (134) over a build plate (138) of the apparatus (130). Feedstock layer (134) may be formed using a roller or other leveling device, using one pass or multiple passes to uniformly form and distribute a desired depth of feedstock (132). Print head (136) selectively deposits liquid binder (133) onto a portion of the first layer (134). The liquid polymer binder (133) is solidified by drying with heat to evaporate solvent of the binder and form a first solidified feedstock (140) containing solid polymer at the portion. Portions of feedstock layer 134 that are not formed to solidified feedstock (140) remain as the original powder feedstock (132). The build plate (136) is moved down (114) and a second or subsequent feedstock layer (142) is formed over the first layer (134) and the first solidified feedstock (140). The print head (136) then selectively deposits a second amount of the liquid polymeric binder (133) onto portions of the second layer (142) and the second amount of the liquid polymeric binder (133) is solidified to form solidified feedstock from the second layer. Portions of the second layer that are not formed to solidified feedstock remain as the original powder feedstock. This sequence of steps of applying a feedstock layer over a previous layer, and applying binder to the new feedstock layer to produce solidified feedstock of the new feedstock layer, is repeated (150) to form a completed multi-layer solidified feedstock composite ("final part") (152) surrounded by the original powder feedstock (132). The multi-layer solidified feedstock composite (152) is a body that contains the solidified feedstock of each formed layer, and is composed of the metal particles from the feedstock dispersed in the solidified (solid) polymer binder.

Optionally, the multi-layer solidified feedstock composite, optionally in the presence of the surrounding original powder feedstock (132), can be heated to cure the liquid polymeric binder (122).

The original (loose) powder feedstock (132) can be removed and separated from the multi-layer composite (152). The multi-layer composite (152) can be moved to a furnace for heating to a sintering temperature that will be effective to remove solidified binder (debind) from the multi-layer composite (152) and to cause the metal particles of the multi-layer composite (152) to become fused to form a final porous sintered metal body (160).

The technique referred to as stereolithography (SLA) is a version of additive manufacturing technology that, as now appreciated and as described herein, can be used to form a porous sintered metal body in a layer-by-layer fashion and using photochemical processes by which light selectively causes chemical monomers and oligomers (together referred to as "polymer" or "liquid polymer binder") of a layer of liquid feedstock to cross-link together and solidify to form a cured polymeric reaction product ("solid polymer") of solidified feedstock of a feedstock layer. The liquid polymer binder is selectively curable by exposure to electromagnetic radiation, such as ultraviolet (UV) light. The feedstock is in liquid form and contains the curable liquid polymer ("liquid polymer binder") in combination with metal particles.

The part to be produced ("printed") is built up by sequential steps of producing a composite ("solid body composite," herein) made of many thin cross sections ("solidified feedstock" of a "layer," herein) of a larger three-dimensional structure. A source of electromagnetic radiation (e.g., a laser) selectively applies electromagnetic radiation over a portion of a layer of the liquid feedstock, which according to the present invention contains metal particles and liquid polymer binder that can be solidified by chemically curing upon exposure to the electromagnetic radiation. The laser selectively irradiates a portion of the layer of the liquid feedstock at a surface of the layer. The electromagnetic radiation causes the liquid polymer binder to solidify by a chemical reaction (i.e., to cure) to form solidified feedstock that contains the metal particles and solidified (cured) polymer.

An additional thin layer of the feedstock is spread over the top surface of the completed layer that contains the solidified feedstock, and the process is repeated with multiple layers being formed on and adhering to a top surface of a previous layer. Multiple layers are deposited, successively, one over each completed layer, to form a multi-layer solidified feedstock composite that is a composite of each layer of solidified feedstock. After all layers of the multi-layer solidified feedstock composite have been formed, portions of the layers that contain original liquid feedstock that has not been used to prepare solidified feedstock are separated from the multi-layer solidified feedstock composite. The multi-layer solidified feedstock composite can be subsequently processed by removing the solidified (cured) polymer from the metal particles (i.e., "debinding"), and by a sintering step to cause metal particles of the multi-layer composite to be fused together to form a porous sintered metal body. These debinding and sintering steps can be performed using a single piece of equipment (oven or furnace), or two separate pieces of equipment.

Figure 2A:
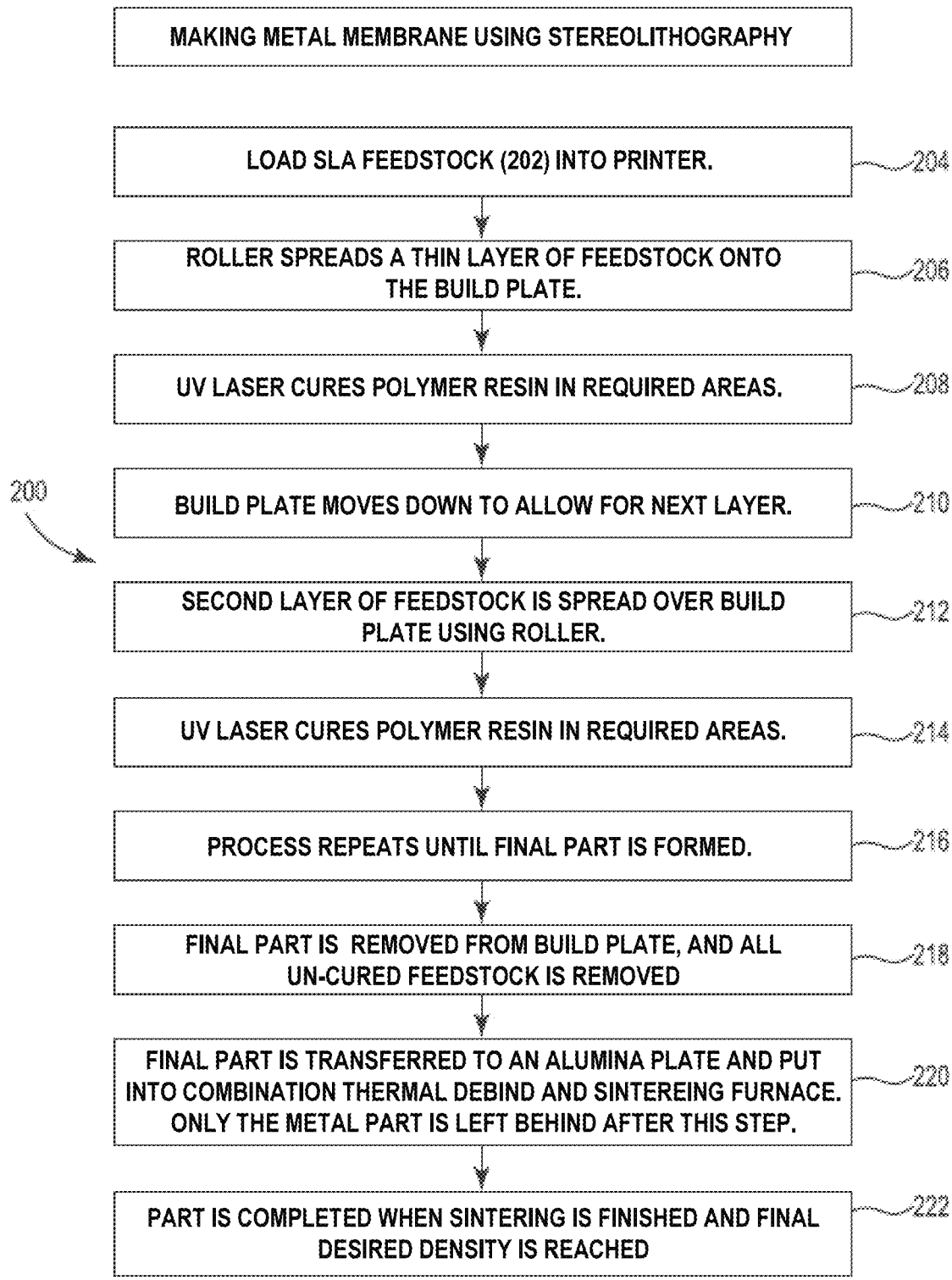

An example of a stereolithography additive manufacturing technique (200) useful for preparing a porous sintered metal body as described herein is shown at FIG. 2A. Feedstock 202 is a liquid that contains metal particles in combination with a liquid curable polymer binder.

The process can be performed using commercially available stereolithography additive manufacturing equipment and liquid polymeric binder. According to example steps of the example method (as shown at FIG. 2A, with steps numbered parenthetically), liquid feedstock (202) contained by an SLA additive manufacturing apparatus is formed as an even layer over a build plate of the apparatus (204, 206). In a subsequent step (208), a source of electromagnetic radiation (e.g., a UV (ultraviolet) laser) selectively irradiates a portion of this first layer with radiation of a wavelength that will chemically cure and solidify the liquid polymer binder of the feedstock. The solidified liquid polymer binder forms solidified feedstock at the irradiated portion. Portions of the layer that are not formed to solidified feedstock remain as the original liquid feedstock. The build plate is moved down (210) and a second layer of the liquid feedstock is formed (212) as a second even layer over the first feedstock layer and over the solidified feedstock of the first feedstock layer. The source of electromagnetic radiation then selectively irradiates a portion of the second layer (214) to solidify (cure) a portion of the second layer of liquid feedstock to form solidified feedstock at portions of the second layer. Portions of the second layer that are not formed to solidified feedstock remain as the original liquid feedstock. Steps 212, 214, and 216 are repeated (218) to form a completed multi-layer solidified feedstock composite ("final part") surrounded by the original liquid feedstock (202). The multi-layer solidified feedstock composite is a body that contains the solidified feedstock of each formed layer, and is composed of the metal particles dispersed in the solidified (solid) polymer binder of the liquid feedstock. The original liquid feedstock (202) can be removed and separated from the multi-layer composite (218). The multi-layer composite can be moved to a furnace for heating to a sintering temperature (220) that will be effective to remove solidified binder (debind) and to cause the metal particles of the multi-layer composite solid be fused to form a final porous sintered metal body having a desired final density (222).

Figure 2B:
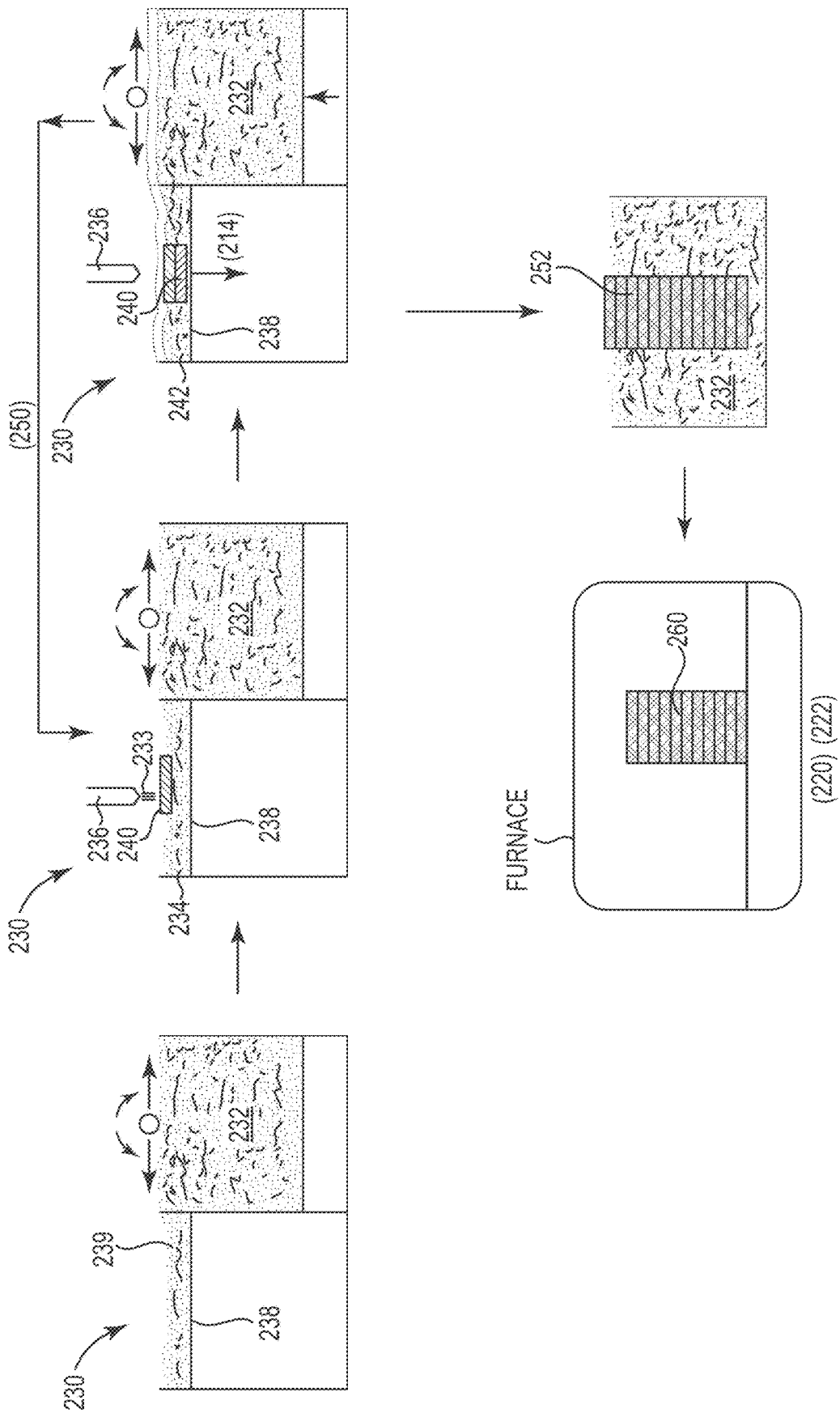

Referring to FIG. 2B, an example process can be performed using commercially available SLA apparatus (230), and using liquid feedstock (232) according to the present description. According to example steps of the method, liquid feedstock (232) is formed as an even feedstock layer (234) over a build plate (238) of the apparatus (230). Laser (236) applies electromagnetic radiation (233) to a portion of the first layer (234) to form first solidified feedstock (240) at the portion. Portions of feedstock layer (234) that are not formed to solidified feedstock (240) remain as the original liquid feedstock (232). The build plate (238) is moved down (214) and a second or subsequent liquid feedstock layer (242) is formed over the first layer (234) and the first solidified feedstock (240). The laser (236) then selectively applies electromagnetic radiation (233) to portions of the second layer (242) to form solidified feedstock from the second layer. Portions of the second layer that are not formed to solidified feedstock remain as the original liquid feedstock. The sequence is repeated (250) to form a completed multi-layer solidified feedstock composite ("final part") (252) surrounded by the original liquid feedstock (232). The multi-layer solidified feedstock composite (252) is a body that contains the solidified feedstock of each formed layer, and is composed of the metal particles from the feedstock dispersed in solidified (solid) cured polymer of the feedstock.

The original liquid feedstock (232) can be removed and separated from the multi-layer composite (252). The multi-layer composite (252) can be moved to a furnace for heating to a debinding temperature and then to a sintering temperature. The debinding temperature will be effective to remove solidified polymer (debind) from the multi-layer composite (252). The sintering temperature, which is normally higher than the debinding temperature, will cause the metal particles of the multi-layer composite (252) to become fused to form a final porous sintered metal body (260).

The technique referred to as selective laser sintering SLS is a form of additive manufacturing technology that can be used as described herein, to form a porous sintered metal body in a layer-by-layer fashion using a laser as a power source to fix in place and optionally sinter metal particles of a powdered feedstock material by directing the laser automatically at selected portions of a feedstock layer according to a digital three-dimensional model. The powder feedstock contains metal particles in combination with thermoplastic polymer (binder). The laser causes the thermoplastic polymer to melt, and the polymer can be re-solidified to bind metal particles of the feedstock together to create solid feedstock.

The feedstock contains metal particles and solid thermoplastic polymer which may be in the form of pore-forming particles. The part to be produced ("printed") is built up by sequential steps of producing a composite ("solid body composite," herein) made of many thin cross sections ("solidified feedstock" of a "layer," herein) of a larger three-dimensional structure. A laser selectively applies electromagnetic radiation over a portion of the feedstock layer. The electromagnetic irradiation causes the solid thermoplastic polymer to melt and contact surfaces of the metal particles. The thermoplastic polymer can re-solidify to form solidified feedstock that contains the metal particles and solidified (re-solidified) thermoplastic polymer.

Next, an additional thin layer of the feedstock is spread over the top surface of the completed layer that contains the solidified feedstock, and the process is repeated with multiple layers being formed on and adhering to a top surface of a previous layer. Multiple layers are deposited, successively, one over each completed layer, to form a multi-layer solidified feedstock composite that is a composite of each layer of solidified feedstock. After all layers of the multi-layer solidified feedstock composite have been formed, portions of the layers that contain original powder feedstock that has not been used to prepare solidified feedstock are separated from the multi-layer solidified feedstock composite. The multi-layer solidified feedstock composite can be subsequently processed by, in any order: removing the solidified (cured) polymer from the metal particles, and by a sintering step to cause metal particles of the multi-layer composite to be fused together to form a porous sintered metal body.

Figure 3A:
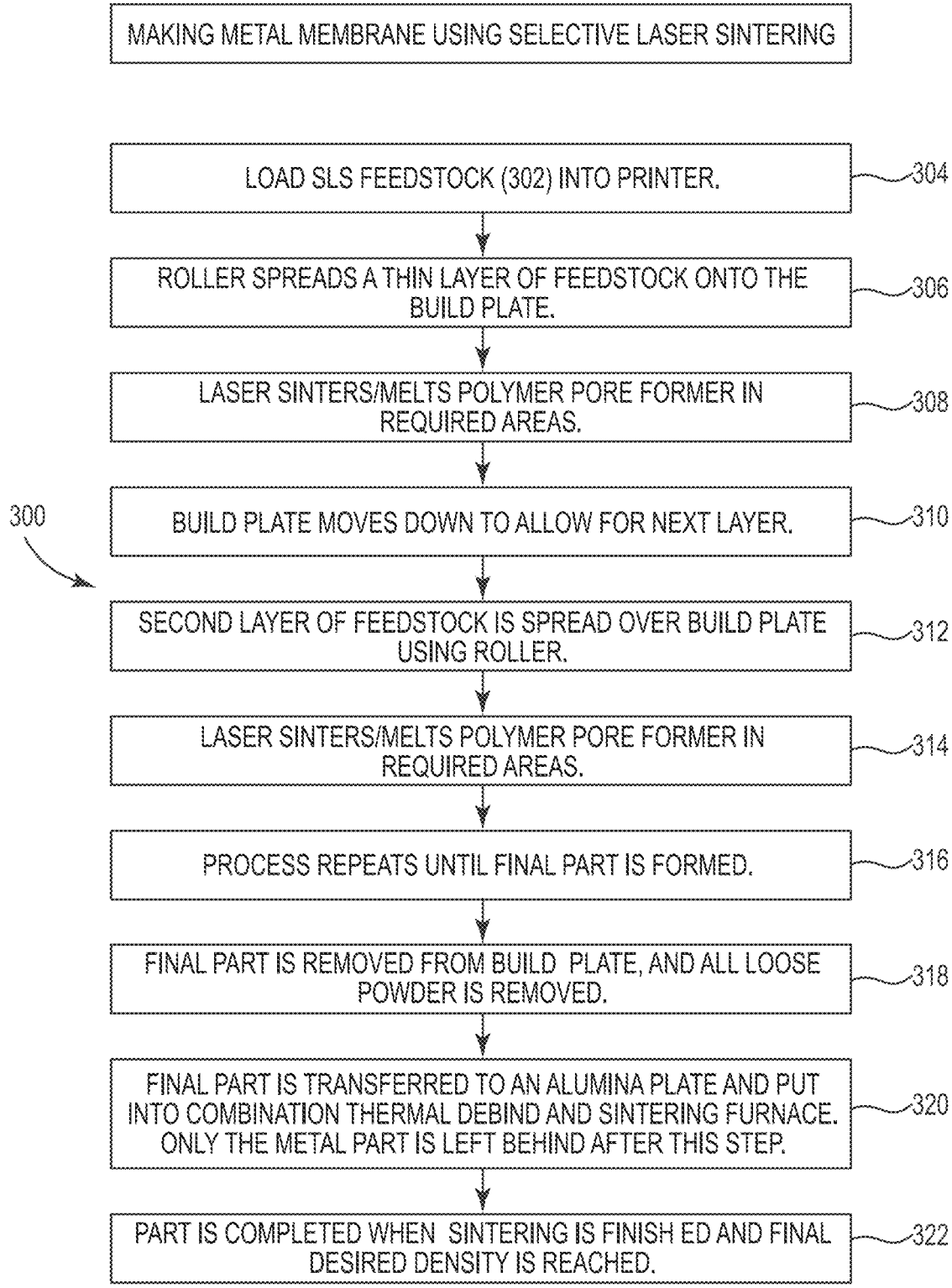

An example of a selective laser sintering additive manufacturing technique (300) useful for preparing a porous sintered metal body as described herein is shown at FIG. 3A. Feedstock 302 is a powder that contains metal particles having thermoplastic polymer coated on the particle surfaces.

The process can be performed using commercially available selective laser sintering additive manufacturing equipment and feedstock that contains metal particles as described herein, coated with thermoplastic polymer. According to example steps of the example method (as shown at FIG. 3A, with steps numbered parenthetically), powder feedstock (302) contained by an SLS additive manufacturing apparatus is formed as an even layer over a build plate of the apparatus (304, 306). In a subsequent step (308), a source of electromagnetic radiation (e.g., a CO2 laser, a YAG laser, a disk laser, a fiber laser, etc.) selectively exposes a portion of this first layer to radiation of a wavelength that will melt thermoplastic polymer of the feedstock and may optionally cause some degree of fusing of the metal particles that are exposed to the radiation. The thermoplastic polymer is allowed to re-solidify and form solidified feedstock (of solid polymer and metal particles) at the portions exposed to the electromagnetic radiation. Portions of the layer that are not formed to solidified feedstock remain as the original powder feedstock. The build plate is moved down (310) and a second layer of the feedstock is formed (312) as a second even layer over the first feedstock layer and over the solidified feedstock of the first feedstock layer. The source of electromagnetic radiation then selectively radiates a portion of the second layer (314) to solidify (cure) a portion of the second feedstock layer to form solidified feedstock at portions of the second layer. Portions of the second layer that are not formed to solidified feedstock remain as the original powder liquid feedstock. Steps 310, 312, and 314 are repeated (316) to form a completed multi-layer solidified feedstock composite ("final part") surrounded by the original powder feedstock (302). The multi-layer solidified feedstock composite is a body that contains the solidified feedstock of each formed layer, and is composed of the metal particles dispersed in the solidified (solid) polymer binder of the powder feedstock. The original feedstock (302) can be removed and separated from the multi-layer composite (318). The multi-layer composite can be moved to a furnace for heating to a debinding temperature and then to a sintering temperature (320) to remove solidified binder (debind) from the metal particles and then to cause the metal particles of the multi-layer composite solid be fused to form a final porous sintered metal body having a desired final density (322).

Figure 3B:
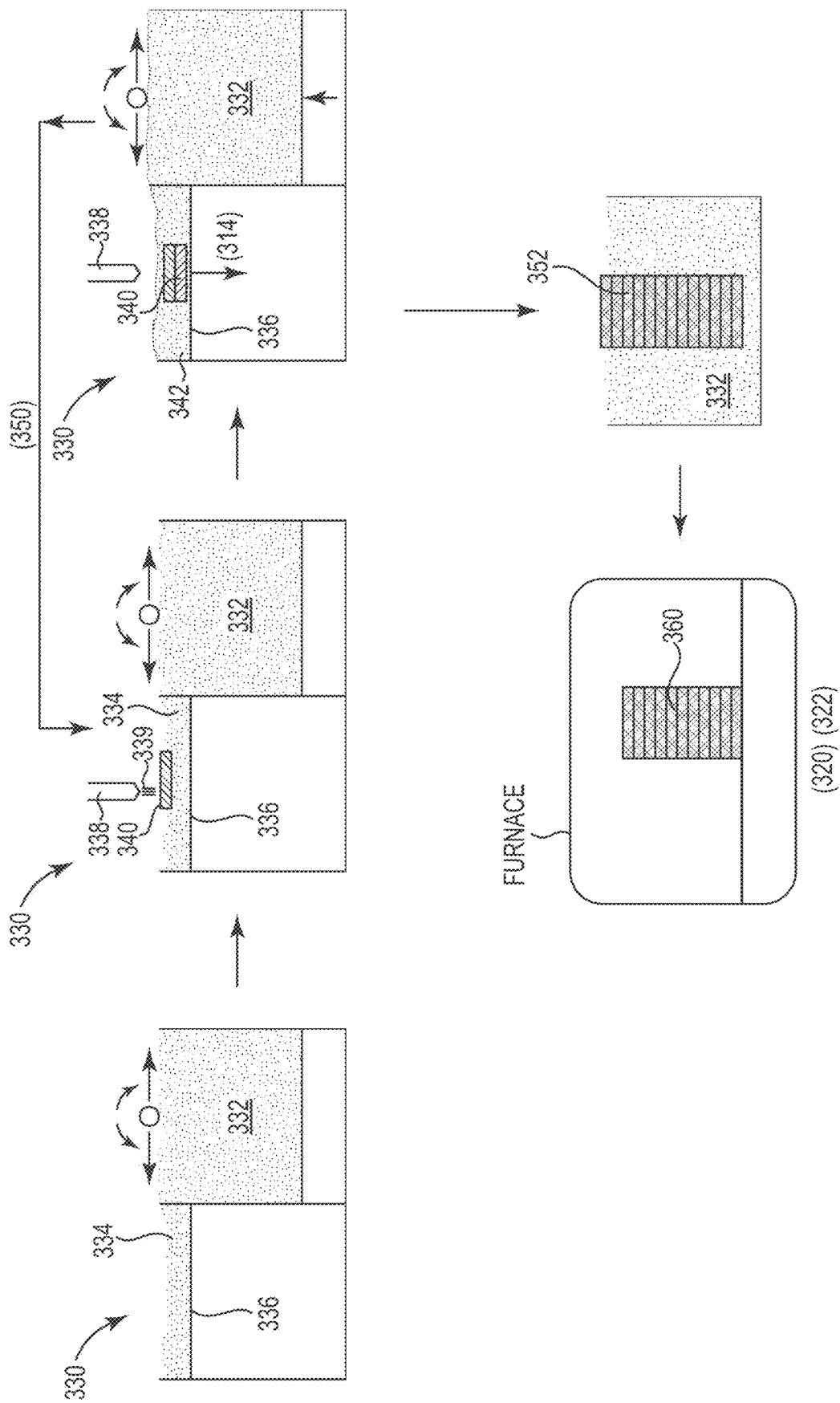

Referring to FIG. 3B, an example process can be performed using commercially available SLS apparatus (230), with a powder feedstock (332) as described herein. According to example steps of the method, powder feedstock (332) is formed using one or more passes of a roller or other leveling device, as an even feedstock layer (334) over a build plate (336) of the apparatus (330). Laser (338) applies electromagnetic radiation (339) to a portion of the first layer (334) to form a first solidified feedstock (340) at the portion. Portions of feedstock layer (334) that are not formed to solidified feedstock (340) remain as the original powder feedstock (332). The build plate (336) is moved down (314) and a second or subsequent powder feedstock layer (342) is formed over the first layer (332) and the first solidified feedstock (340). The laser (338) then selectively applies electromagnetic radiation (339) to portions of the second layer (342) to form solidified feedstock from the second layer. Portions of the second layer that are not formed to solidified feedstock remain as the original powder feedstock. The sequence is repeated (350) to form a completed multi-layer solidified feedstock composite ("final part") (352) surrounded by the original powder feedstock (332). The multi-layer solidified feedstock composite (352) is a body that contains the solidified feedstock of each formed layer, and is composed of the metal particles from the feedstock dispersed in solidified (solid) thermoplastic polymer of the feedstock.

The original powder feedstock (332) can be removed and separated from the multi-layer composite (352). The multi-layer composite (352) can be moved to a furnace for heating to a debind temperature and then to a sintering temperature, to remove solidified polymer (debind) from the metal particles of the multi-layer composite (352), and to cause the metal particles of the multi-layer composite (352) to become fused to form a final porous sintered metal body (360).

Example steps of each of these processes can include a step of removing solid polymer from the multi-layer solidified feedstock composite (a "debind" step), and a step of sintering the metal particles of the multi-layer solidified feedstock composite. These two steps can be performed separately, or, preferably, in a single step of heating the multi-layer solidified feedstock composite.

A useful or preferred debinding step will remove solid polymer from the metal particles. The debinding step exposes the multi-layer composite to an elevated temperature that is sufficient to remove the solid polymer, as well as to remove any other remaining non-metal materials from the multi-layer composite. Following the debind step, the metal particles of the composite remain as a substantially residue-free porous body that includes substantially only the metal particles. For example, after a thermal debind step (also, after a sintering step) the porous body can contain not more than 1, 0.5, 0.1, 0.05, or 0.01 weight percent of any component of the binder, antioxidant, surfactant, or other ingredient of a feedstock or polymeric binder, etc., i.e., can contain at least 99, 99.5, 99.9, 99.95, or 99.99 weight percent metal particles. Following the debind step, the body is made of the metal particles in an unfused, un-sintered state, but is self-supporting The same heating step may also be a sintering step that causes the metal particles to become fused and connected. The term "sintering" as used herein has a meaning that is consistent with the meaning that this term is given when used in the arts of porous sintered metal structures, such as porous sintered metal membranes of the type that may be used as a metal filter membrane. Consistent therewith, the term "sintering" can be used to refer to processes of bonding (e.g., "solid state welding" or "fusing") together a collection of small, sinterable particles of one or more different types (sizes, compositions, shapes, etc.) by applying heat to the particles (i.e., to the porous body) in a non-oxidizing environment so that surfaces of the particles reach a temperature that causes the particle surfaces to become fused together by a physical (mechanical) bond between the particles surfaces, but that does not cause the particles to melt (i.e., none of the metal materials reaches its melting temperature).

A sintering step is performed at a temperature that is above the sintering point of metal particles of the body, but below the melting temperature of the metal particles. As used herein, a "sintering point" of a metal particle is a temperature at which the material of the particle is capable of being sintered, i.e., a temperature at which the metal particles begin adhering to other metal particles of the body being sintered, and can be fused to another particle, e.g., at a particular pressure such as at atmospheric pressure. A sintering point of a material (e.g., metal) is normally below a melting temperature of the material, meaning the temperature at which the metal becomes liquid.

Thus, useful temperatures for performing a sintering and a debinding step can depend on the composition of the solid polymer for the debind step, and the composition of the metal particles and the sintering point of the particles, as well as the size of the particles being sintered, e.g., whether the particles are "coarse" (larger) or fine (smaller). For nickel, a sintering point may be in a range from 550 to 750 degrees Celsius, and a sintering step may be performed at a temperature in a range from 550 to 800 degrees Celsius. For nickel and stainless steel alloys, a sintering point may be in a range from 950 to 1250 degrees Celsius, and a sintering step may be performed at a temperature in a range from 950 to 1300 degrees Celsius. A sintering step can be performed in a furnace or oven and in a non-oxidizing atmosphere that will not react with or otherwise detrimentally affect the metal particles of the body being sintered, e.g., in a vacuum or in an atmosphere of concentrated or pure hydrogen, concentrated or pure inert gas, or a combination of concentrated or pure hydrogen and inert gas.

The porous body formed by additive manufacturing techniques is made using metal particles that are arranged by steps of the additive manufacturing technique that cause the particles to become interconnected during a sintering step. The particles are selected to exhibit physical properties, including morphology (including shape) and density properties, that allow the particles to be present as part of the solidified feedstock in a relatively low amounts by volume, but to still become interconnected upon sintering.

In specific, preferred metal particles for forming a porous sintered metal body by an additive manufacturing technique can have a low "relative apparent density." With a low "relative apparent density," the particles can be present in a low volume percentage within solidified feedstock as described, such as in an amount of less than 50 percent by volume metal particles based on total volume solidified feedstock, while still being capable of being processed by sintering to form a self-supporting porous sintered metal body. With a low "relative apparent density," the metal particles, even when present at a low percentage of the volume of the solidified feedstock, can still be capable of being effectively fused together by sintering to form a useful porous sintered metal body, e.g., a porous body that is "self-supporting," made of fused interconnected particles, and, as one example, is useful as a filter membrane as described herein.

The metal particles, as a collection, have physical properties that include size, shape, and density that allow the metal particles to be distributed within a feedstock layer and solidified feedstock at a relatively low volumetric amount, yet to be still processable by additive manufacturing steps and sintering to form a useful (e.g., interconnected and self-supporting) porous sintered metal body. A low volumetric amount of the metal particles in the solidified feedstock is desired so that a resultant sintered body exhibits a relatively high porosity, so that the sintered body can be effectively used as a porous filter membrane. Yet, even at a low volumetric amount in the solidified feedstock (to produce a high porosity sintered body), the metal particles contained in the solidified feedstock must have sufficient proximity between a sufficient amount of adjacent surfaces of the particles to become effectively fused and interconnected upon sintering, so that the metal particles that form the sintered body are highly interconnected and, therefore, the porous sintered metal body is self-supporting.

As used herein, a body that is "self-supporting" is a body that is capable of supporting its own weight during use, in a given form or shape, without collapsing and preferably without sagging to more than an insignificant degree. A porous sintered metal body as described herein that is self-supporting can be handled, moved, and optionally further processed, without the need for support from another structure such as a polymeric binder.

Specifically with respect to a self-supporting sintered body, a collection of metal particles can be formed into a porous sintered metal body that is self-supporting if the collection of metal particles includes a sufficiently high percentage of particles that are sufficiently close to each other during additive manufacturing steps (e.g., having contacting or near-contacting surfaces as part of a feedstock layer or solidified feedstock) to become fused together (i.e., "connected" or "interconnected") upon being sintered. Preferably, a high percentage of the metal particles of solidified feedstock are located sufficiently close together, e.g., have at least one surface that contacts or nearly contacts at least one other metal particle surface, so that most or essentially all of the metal particles (e.g., 95, 99, or 99.9 percent of the total amount of particles) of the solidified feedstock become a fused particle of the porous sintered metal body. The high degree of contact or proximity (near contact) between metal particle surfaces can be present in a feedstock, a feedstock layer, solidified feedstock, and as part of a multi-layer solidified feedstock composite. The high degree of contact or proximity between the particle surfaces also remains during processing of the multi-layer solidified feedstock composite, such as in a debind step (to remove polymer from surfaces of particles of a multi-layer solidified feedstock composite) and during and after a sintering step.

Referring to FIGS. 1A, 1B, 2A, 2B, 3A, and 3B, example additive manufacturing techniques as described involve the use of raw materials that include metal particles. The metal particles can be in the form of a collection of small particles, e.g., as a powder, with the particles being in any of various known particle forms such as individual metal particles referred to as "agglomerated particles," dendritic particles," or "fibrous particles," among others.

The metal particles can be of any size or size range that is effective, including small or relatively small particles on a scale of microns (e.g., having an average size of less than 500 microns, less than 100 microns, less than 50 microns, 10 microns, or less than 5 microns).

Optionally, a metal particle powder may contain a combination of particles that have a bimodal size distribution. An example powder may contain a bi-modal combination of micron-size particles and nano-size particles. A potential function and advantage of a powder that contains the nano-size particles in combination with micron-size particles is improved formation of an interconnected particle matrix by sintering. The nano-size particles can facilitate sintering by acting as "necking agents" that connect the larger (micron-size) particles. A sintering step may occur at a lower temperature due the presence of the nano-size particles, and may optionally be performed using microwave energy.

The term "metal" as used herein refers to any metallic or metalloid chemical element or an alloy of two or more of these elements. Useful or preferred particles may be made of metals that include nickel, nickel alloy, and stainless steel, among others (see below).

The metal particles can be selected to achieve effectiveness in processing as described, to be capable of being contained in a feedstock, formed into a feedstock layer, formed into solidified feedstock and a multi-layer solidified feedstock composite, and then sintered to form a porous sintered metal body that will effectively perform as a filter membrane. The size, shape, and chemical makeup of the metal particles can be any that are effective for these purposes. In some embodiments, metal particles that have been identified as being useful as described herein can be selected based on size, shape (including morphology), and density properties.

Density properties of selected metal particles can be described as apparent density (a.k.a. bulk density), and as relative apparent density (apparent density divided by theoretical (or "particle" density)). Example particles made of nickel, nickel alloy, or stainless steel, measured in powder form, can have an apparent ("bulk") density that is below 2 grams per cubic centimeter (g/cc), e.g., below 1.8 g/cc, or below 1.5 g/cc. Other materials may have higher density values (e.g., refractory metals) or lower apparent density values (e.g., certain ceramic materials). As is known, an apparent (bulk) density of a powder (collection of particles) refers to the mass of the powder for a given volume of the powder, with the volume including volume of the particles as well as volume of spaces between the particles in powder form. Methods for measuring apparent (bulk) density are well known, and include ASTM B703-17 "Standard Test Method for Apparent Density of Metal Powders and Related Compounds Using the Arnold Meter."

Example metal particles in the form of a powder can also be selected to have a "relative apparent density" that allows for processing as described, to produce a porous sintered metal body by an additive manufacturing technique. As identified herein, particles can be selected based on relative apparent density to allow the particles to be successfully processed by additive manufacturing steps and subsequent sintering to produce a porous sintered metal body having a desirably high porosity, and also with particles that are interconnected and that form a self-supporting body. As used herein, and as commonly understood, the term "relative apparent density" is calculated as a ratio of an apparent density of a powder divided by a theoretical density of the powder. The theoretical density of a collection of particles (e.g., powder), also sometimes referred to as a "particle density" of the particles, refers to the density of the material (e.g., metal) that makes up the particles, e.g., the density (mass per volume) of a single particle, or a density of a collection of particles that is calculated based on weight per volume, with the volume calculated to include only the volume of the particles and not the volume of void space between the particles. Example metal particles that are useful according to methods as described can be in the form of a powder having a relative apparent density in a range from 5 to 35 percent of the theoretical density.

According to the present description, it has been determined that particles that exhibit a low "relative apparent density" can be processed by additive manufacturing steps to form a porous sintered metal body that has a high porosity and a correspondingly low solids loading, i.e., a low volume percent of the metal particles, such as below 50 percent (i.e., a high porosity). The low relative apparent density particles have physical shape and size properties that cause a high degree of contact or proximity between surfaces of the metal particles when included in solidified feedstock (even if present at a low amount (a low volume percent) in the solidified feedstock), with a high amount of space between particles. With a high degree of contact or proximity between the particle surfaces, even with a high void space, solid polymer of the solidified feedstock can be removed, and the metal particles can be processed by sintering to cause the particles to fuse together sufficiently at their surfaces to become interconnected and self-supporting, to form a useful porous sintered membrane.

A relatively low "relative apparent density" is a property of a collection of particles that can be directly affected by physical size and shape properties of the particles. Size and shape properties of powders made of metal can vary greatly, with known metal particles having many different shapes. Some examples of common particle shapes include those referred to as spherical, rounded, angular, flakey, cylindrical, acicular, cubic, columnar, dendritic, elongated, and branched. Other particle shapes, and other terms used to describe specific shapes, are also known. Different types of metal particles may also be agglomerated or non-agglomerated, or "fibrous." Certain types of particles, or branches or fibrils thereof, that have a predominant length dimension relative to small thickness and width dimensions can be characterized by as having a high aspect ratio.

Metal particles useful in additive manufacturing methods as described have shape and size features that cause the particles to exhibit a low relative apparent density, e.g., to form a collection of particles that as a powder includes a high level of void space between particles, e.g., a low packing density. Size and shape features of particles that have a low relative apparent density include features that cause a low packing density ("packing efficiency"). Shape features of particles that can produce low packing density (and high void space) include: irregular (non-geometric) shape features that include multiple fibrils or branches in random (non-repeating) arrangements between particles; an elongate shape of particles or portions of particles (e.g., a high aspect ratio); a high surface area; branching; twisted, bent, or curved filaments or branches; and the like that prevent close packing of the particles when the particles are part of a powder, and that result in the presence of substantial void space between the particles.

Examples of particle shapes that can result in a low relative apparent density include shapes that are branched, shapes referred to as "dendritic," and shapes referred to as "fibrous."

Dendritic metal particles include particles that have a dendritic morphology as described in U.S. Pat. No. 5,814,272. As presented therein, the term "dendritic" refers to a highly anisotropic, irregular morphology comprising one or more filaments individually having one dimension substantially greater than the other two dimensions of the filament. The filaments can be straight or bent and can also be branched or unbranched, with an irregular surface. Dendritic particles are characterized by low packing efficiencies compared to particles of more regular morphology and, therefore, form powders of lower apparent (bulk) density than those formed by particles of more regular morphology.

Figure 4A:
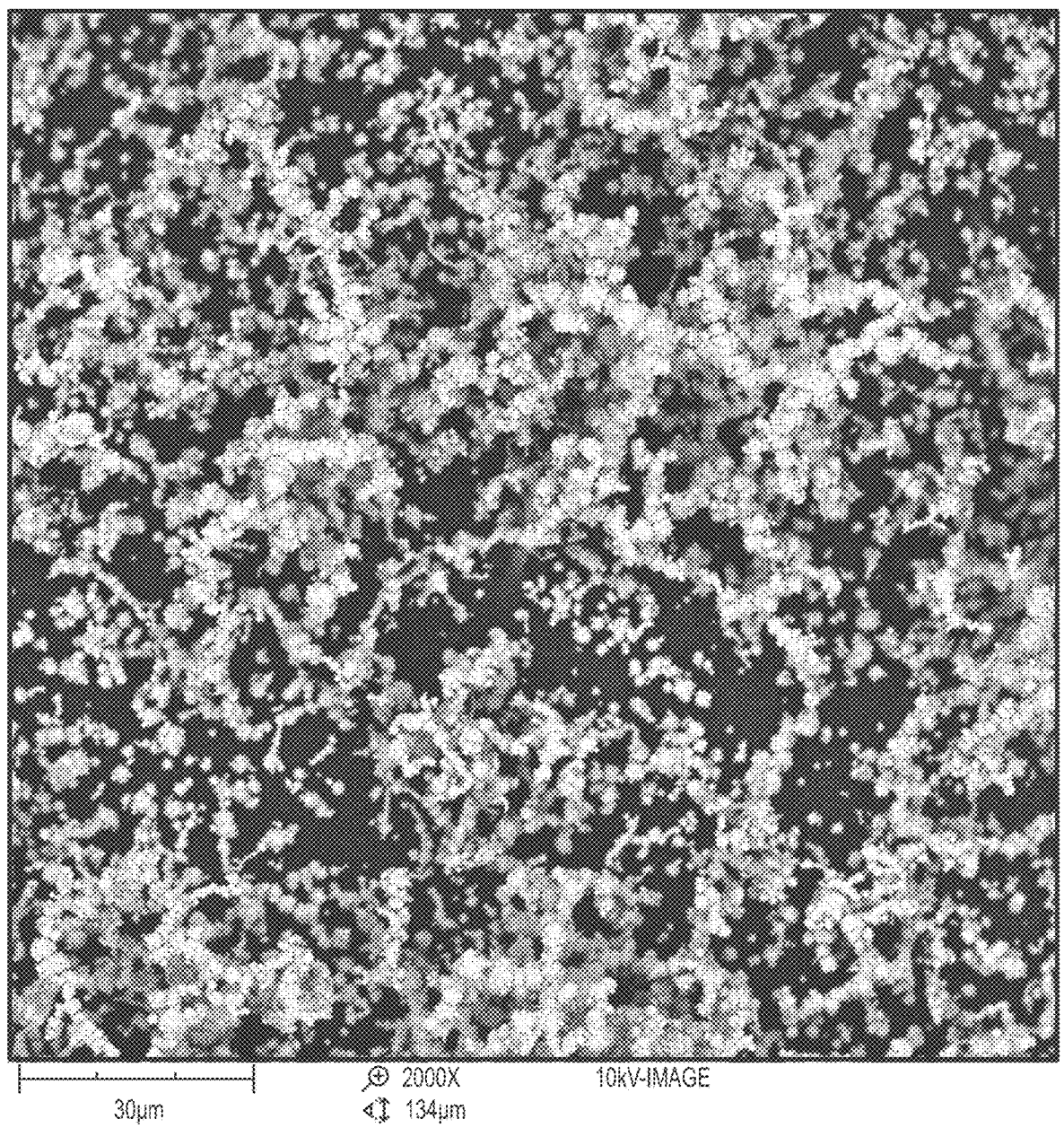
FIGS. 4A, 4B, 4C, and 4D show collections of metal particles that are described in the present description.
Figure 4B:
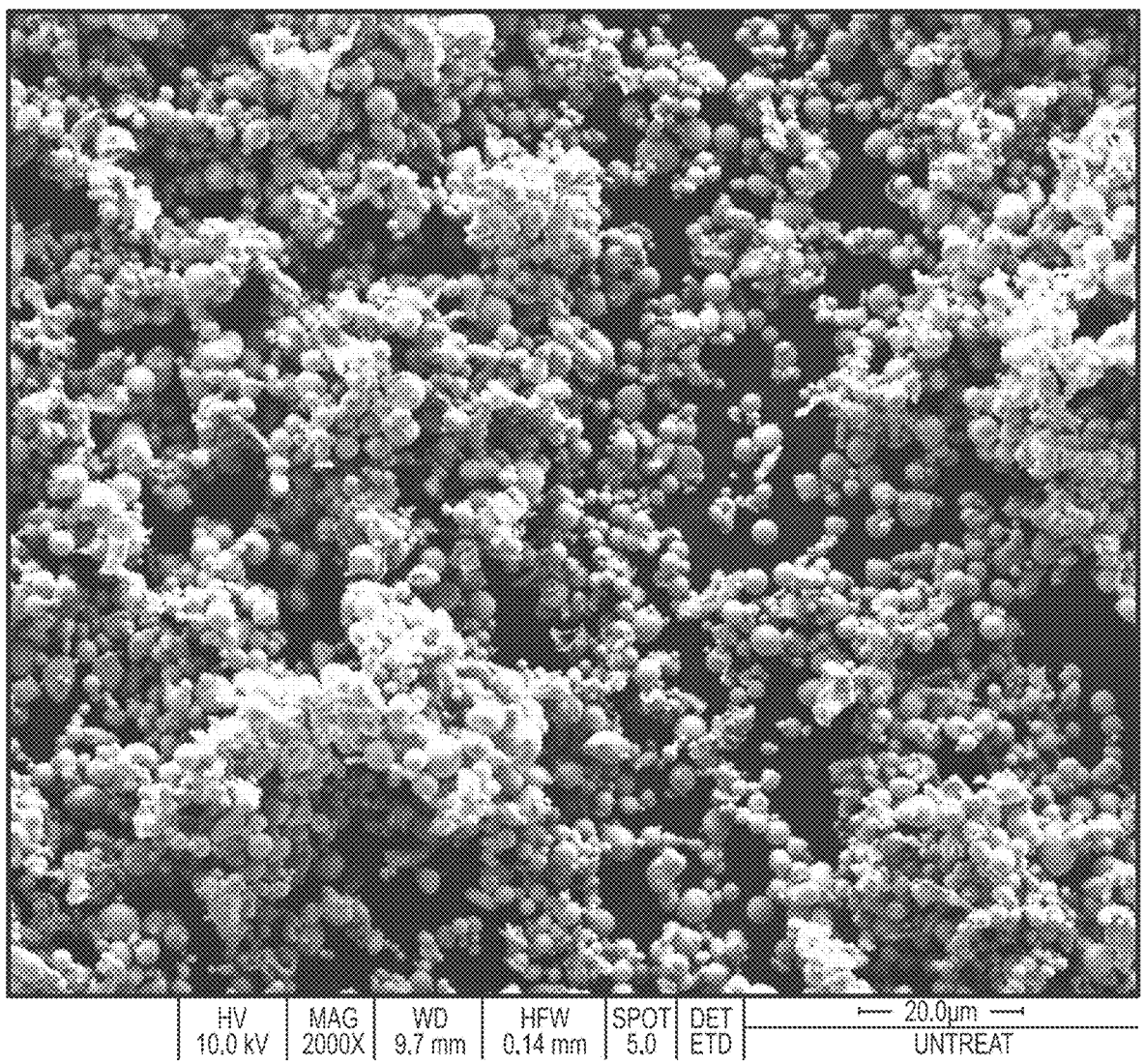
Figure 4C:
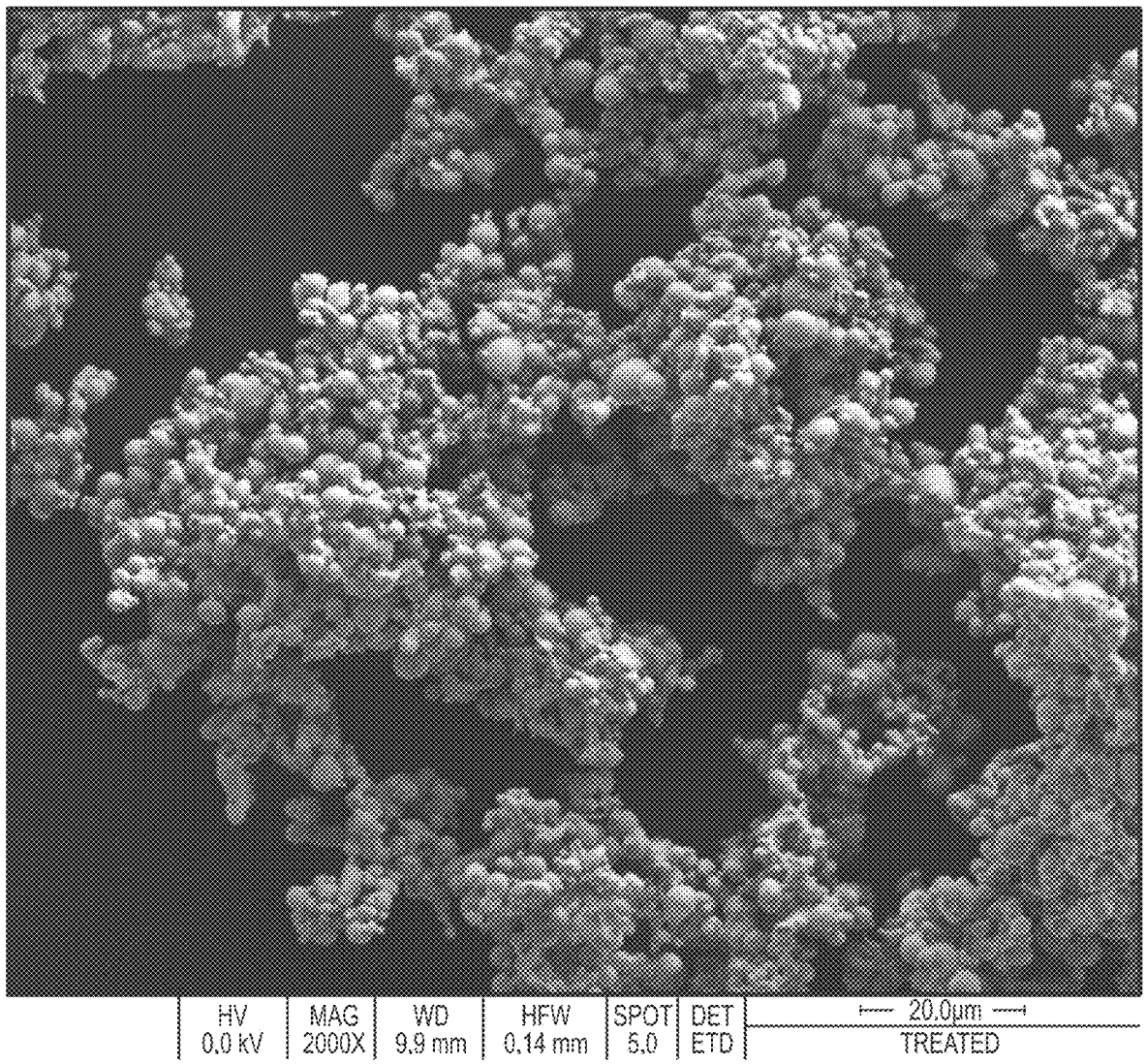

Examples of dendritic particles include the Nickel 255 particles shown at FIG. 4A, and the treated stainless steel particles shown at FIG. 4C.

Dendritic metal particles can be prepared and processed in a manner to cause the particles to achieve a desired dendritic morphology and a useful relative apparent density. Examples of processes useful for producing dendritic metal particles having density properties as described are presented in U.S. Pat. No. 5,814,272, the entirety of which is incorporated herein by reference. As explained therein, metal particles can be processed to have a relatively low "relative apparent density" by processing the particles to be dendritic. In general, effective processing methods may include steps of: (1) heating a powder comprising non-dendritic metal particles under conditions suitable to form a lightly sintered material; and (2) breaking the lightly sintered material to form a powder comprising dendritic metal particles.

The term "lightly sintered material" refers to a material that has been processed to cause fusion of metal powder particles through an initial stage of sintering, as defined by Randall (Randall in "Powder Metallurgy Science," second edition, German, ed., Metal Powder Federation Industry (1994), the contents of which are incorporated herein by reference). In the initial stage of sintering, or short-range diffusional sintering, bonds form between metal particles at contacted particle surfaces, resulting in the fusion of the particles with their immediate neighbors only. Thus, the initial stage of sintering yields a brittle structure of low mechanical strength. For a given material, sintering proceeds slowly beyond this initial stage at temperatures at the lower end of the material's sintering range. For purposes of the present description, the term "initial stage sintering" refers to the sintering of a powder under conditions in which sintering does not proceed substantially beyond the initial stage.

FIG. 4A is a photomicrograph that shows dendritic particles made of Nickel 255 (an example of a commercially pure nickel metal powder). FIG. 4B is a photomicrograph of stainless steel particles before processing the particles to have a dendritic form; FIG. 4C is a photomicrograph of the stainless steel particles of FIG. 4B after processing to cause the particles to be dendritic.

Figure 4D:
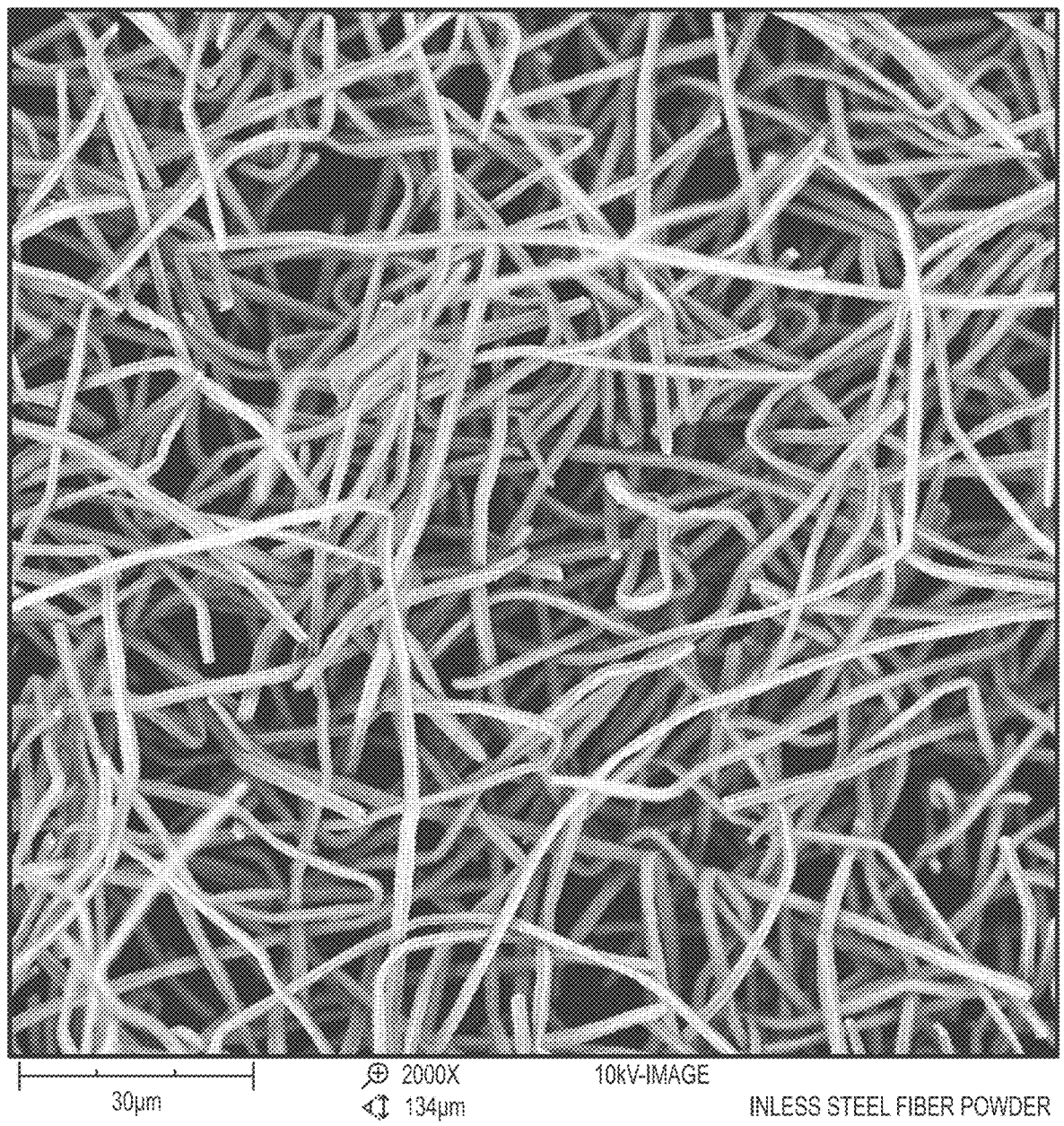

Another example of metal particles that are characterized by low packing efficiencies and a relatively low "relative apparent density" are particles referred to as "fibrous" particles. Fibrous particles are elongated (e.g., "noodle-like"), optionally curved or bent, with a high aspect ratio, such as an aspect ratio (ratio of length to diameter) of at least 10:1 (length:diameter), at least 30:1, at least 50:1, or at least 75:1 or at least 100:1. Examples of fibrous metal particles include fibrous stainless steel particles such as those shown at FIG. 4D.

Other types of metal particles in powder form, recognized as being non-dendritic and non-fibrous, are known and are also useful for preparing metal bodies by sintering. These particles exhibit a relatively high packing efficiency compared to dendritic or fibrous particles and do not normally (without being combined with dendritic or fibrous particles) have a low relative apparent density. Examples of these types of particles include particles that are generally (substantially) unbranched, that have a relatively low aspect ratio (e.g., below 5:1 or below 3:1 or below 2:1), including particle types referred to as spherical, rounded, angular, flaked, cylindrical, acicular, and cubic.

A collection of particles useful in a method as described, in the form of a powder and having a low relative apparent density, may contain particles that all have substantially the same or comparable size, shape, and morphology, e.g., a collection of all dendritic particles, or a collection of all fibrous particles. Alternately, if desired, a collection of particles may contain a combination of two or more different types of metal particles that have different size, shape, or morphology features. Metal particles of a powder may include, for example, a combination of both dendritic particles and non-dendritic particles, or a combination of both fibrous particles and non-fibrous particles, etc., with the combination having a relative apparent density sufficient to be processed to form a porous sintered metal body, and precursors thereof, as described.

A collection of metal particles used in a feedstock can include one or more different types of metal particles. Examples of useful particle for a feedstock can include collections of particles that are made substantially or entirely of a single type of metal particles, e.g., a collection of particles made of at least 90, 95, 99, or 99.9 weight percent of one type of metal (including metal alloys) such as steel particles (e.g., stainless steel), nickel particles, nickel alloy particles, or particles made of another metal or metal alloy. Commercial examples include those sold under the following designations: Nickel 255, "Alloy 22" (Hastelloy® C-22), and 316L Stainless Steel.

Some nickel particles contain at least 99 percent by weight nickel based on total weight particles, with not more than a small amount of impurities such as carbon.

Other particles may be made of nickel alloys that contain a combination of nickel (e.g., from 45 to 56 weight percent), chromium (e.g., from 15 to 30 weight percent), and molybdenum (e.g., from 8 to 18 weight percent), along with lower amounts of metals such as iron, cobalt, tungsten, manganese, silicon, carbon, vanadium, and copper. A specific example of a nickel alloy referred to generically as nickel "alloy 22" (e.g., HASTELLOY® C-22®) contains (weight percent): nickel (56 Balance), chromium (22), molybdenum (13), iron (3), cobalt (2.5 max), tungsten (3), manganese (0.5 max), silicon (0.08 max), carbon (0.01 max), vanadium (0.35 max), and copper (0.5 max).

An example of a stainless steel alloy is Stainless Steel Alloy 316L, which can contain (weight percent): chromium (16-18), nickel (10-14), molybdenum (2-3), manganese (2.0 max), silicon (0.75 max), carbon (0.08 max), phosphorus (0.045 max), sulfur (0.30 max), nitrogen (0.10 max), and iron (balance).

Useful and preferred metal particles as described can have an apparent density and a relative apparent density as described, with particular metal alloys having characteristic density properties and characteristic combinations of density properties.

Useful or preferred stainless steel particles may have an apparent density in a range from 0.5 to 2 grams per cubic centimeter, e.g., from 0.8 to 1.2 grams per cubic centimeter, and a relative apparent density in a range from 5 to 25, e.g., from 7 to 20 percent of theoretical density.

Useful or preferred nickel particles may have an apparent density in a range from 0.3 to 1.5 grams per cubic centimeter, e.g., from 0.4 to 0.8 grams per cubic centimeter, and a relative apparent density in a range from 4 to 17 percent of theoretical density, e.g., from 5 to 9 percent of theoretical density.

Useful or preferred particles made of nickel alloy having high amounts (weight percent) of: nickel (e.g., from 45 to 56 weight percent), chromium (e.g., from 15 to 30 weight percent), and molybdenum (e.g., from 8 to 18 weight percent), such as Hastelloy® C-22, may have an apparent density in a range from 0.5 to 2 grams per cubic centimeter, e.g., from 1.2 to 1.8 grams per cubic centimeter, and a relative apparent density in a range from 5 to 13 percent of theoretical density, e.g., from 7 to 11 percent of theoretical density.

An amount of particles by volume in feedstock, solidified feedstock, or both, can be an amount that is useful to produce a porous sintered metal body as described herein, with a porosity as described. Examples, on a per total volume basis, can be in a range from 20 to 50 volume percent based on total volume solidified feedstock, e.g., from 25 to 45 percent.

A porous sintered metal body prepared according to a method as described may be useful as a filter membrane for filtering gases, e.g., gases used in semiconductor processing. Various features of porous sintered metal bodies are considered to affect the usefulness of the porous body as a filter membrane. In filtering gaseous materials for use in semiconductor processing, the gaseous fluid may be supplied at a pressure that is approximately atmospheric (e.g., under 2 atmospheres), above atmospheric pressure, or below atmospheric pressure (e.g. vacuum conditions). The process that uses the gaseous fluid may require a very high removal rate of nano-scale and micron-scale particles, e.g., at least 3, 4, 5, 7, or 9 as measured by "log reduction value" (LRV) of a filtering step. The process of filtering these gaseous materials also may be performed at relatively low flow-rates, e.g., below 50, 25, 10, 5, 2, 1, or 0.5 standard liters per minute (slpm) per square centimeter of frontal filter area. Methods as described herein can be useful to prepare filter membranes that meet requirements such as these, to allow the filter membrane to be used effectively as a filter membrane, for example for filtering a gaseous material for use in semiconductor processing.

Advantageously, a sintered porous body formed by an additive manufacturing method can be prepared to have any of a very large variety of three-dimensional shapes, including certain types of shapes that may not be possible to produce by previous techniques for forming porous bodies of the type useful as a filter membrane. Example shapes can be generally three-dimensional, including forms that are non-tubular (e.g., somewhat or substantially flat or planar), and forms that are tubular, which include a substantially annular or cylindrical forms or modifications thereof.

Figure 5A:
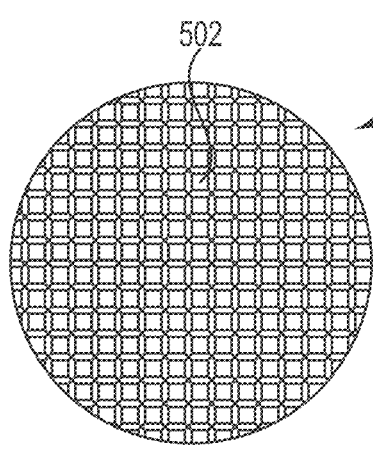
FIGS. 5A, 5B, 5C, and 5D show various shapes of example sintered porous bodies that can be formed by additive manufacturing techniques described herein.
Figure 5B:
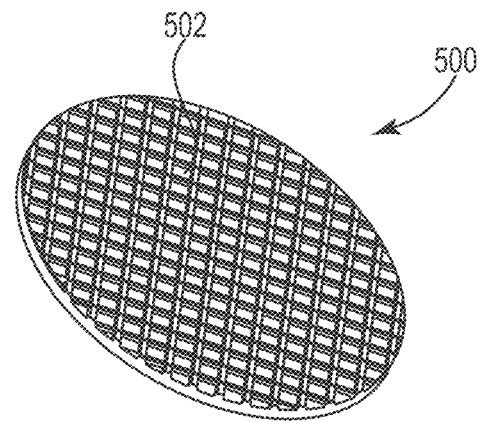
Figure 5C:
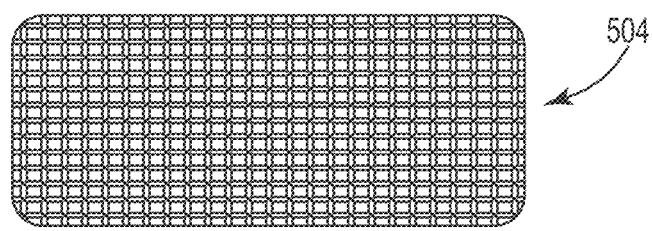
Figure 5D:
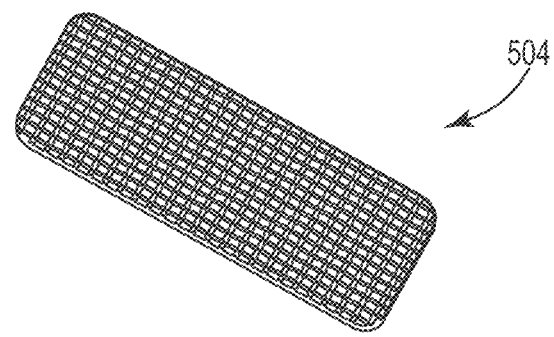

Examples of non-tubular shapes may be in the form of a flat, curved, or rounded plate or "cup," which has two opposed major surfaces and a thickness between the two opposed surfaces. The opposed major surfaces may be generally flat or curved and additionally may have a surface structure that is either flat or that includes a non-flat patterned or non-patterned three-dimensional structure such as raised ridges or walls, depressions or channels, or "waffling." See FIGS. 5A 5B, 5C, and 5D. As shown at FIGS. 5A and 5C (top views), and 5B and 5D (perspective views), filter membranes 500 and 504 can include two opposed major surfaces having a width and a length, and a thickness between the two surfaces that is substantially less than the width and the length. At least one surface may include a three-dimensional structure, for example a repeating or a non-repeating pattern of depressions (e.g., sunken channels) or elevated or raised ridges, walls, or the like, with one example being a waffling pattern as shown at FIGS. 5A, 5B, 5C, and 5D. Other shapes of surface structures and patterns are also possible using the presently-described injection molding technique.

Figure 6A:
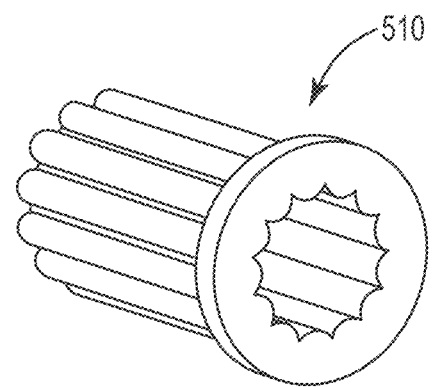
FIGS. 6A and 6B show an example sintered porous body that can be formed by additive manufacturing techniques described herein.
Figure 6B:
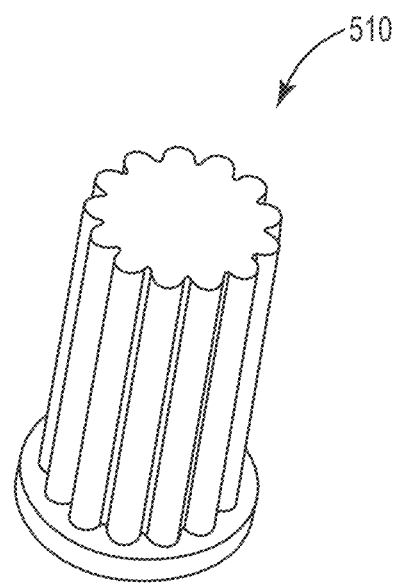

Alternately, a porous sintered metal body may be three dimensional, e.g., a tubular membrane, such as in the form of a tube (e.g., annulus, cylinder) having a round or circular cross-section when viewed along an axis of the tube, i.e., a cylinder. Other tubes may have non-circular shapes in cross section, such as a shape that includes a repeating pattern of angles, corners, curves (e.g., fluting), or a pleated pattern (multi-pointed star, or a circular "zig-zag" pattern) extending about an interior or an exterior surface of the tube. The membrane (in any shape) includes two opposed major surfaces and a thickness between the two opposed major surfaces. At least one end of a tubular membrane can be open, and a second end may be opened or closed. See, e.g., FIGS. 6A and 6B, showing perspective views of annular filter membrane 510 having a non-circular cross section that includes multiple repeating curved surfaces, e.g., "pedals" or "fluting," with one open end and one closed end.

As used herein, a porous sintered metal body that is said to be formed by an additive manufacturing method may be structurally or physically identifiable as a body that has been produced by an additive manufacturing method, i.e., that includes a physical feature that is indicative of the body being formed by an additive manufacturing method. During additive manufacturing methods, a body is formed by multiple sequential steps of applying and solidifying multiple layers of feedstock to form solidified feedstock from each layer. Indications of the multiple layers of solidified feedstock may be visually identifiable after a sintering step, either with or without optical microscopy (e.g., at 50, 100, 200, or 500 times magnification).

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in the details, particularly in matters of shape, size, and arrangement of parts without exceeding the scope of the disclosure. The disclosure's scope is, of course, defined in the language in which the appended claims are expressed.

In a first aspect, a method of forming a porous sintered metal body by additive manufacturing steps, the method comprises: forming a layer on a surface, the layer comprising feedstock that contains metal particles; at portions of the layer, selectively forming solidified feedstock comprising the metal particles and solid polymer, the portions containing from 20 to 50 percent of the metal particles by volume; forming a second layer over the layer that contains the solidified feedstock, the second layer comprising feedstock that contains metal particles; at portions of the second layer, selectively forming solidified feedstock comprising the metal particles and solid polymer, the portions containing from 20 to 50 percent of the metal particles by volume; and sintering the metal particles of the portions to form a porous sintered metal body containing from 20 to 50 percent metal particles by volume.

A second aspect according to the first aspect further comprises separating the solidified feedstock from feedstock of the layers that remains after forming the solidified feedstock.

A third aspect according to the first or second aspect is wherein the metal particles have an apparent density below 2.0 grams per cubic centimeter.

A fourth aspect according to any of the preceding aspects is wherein the metal particles have a relative apparent density in a range from 5 to 35 percent of a theoretical density of the particles.

A fifth aspect according to any of the preceding aspects is wherein the feedstock comprises the metal particles and pore forming polymer particles.

A sixth aspect according to the fifth aspect further comprises forming the solidified feedstock by selectively applying liquid polymeric binder to the areas and allowing the liquid polymeric binder to solidify.

A seventh aspect according to the fifth aspect further comprises forming the solidified feedstock by selectively applying electromagnetic energy onto the areas to cause the pore-forming polymer particles to melt.

An eighth aspect according to any of the first through the fourth aspects is wherein the feedstock composition comprises the metal particles and curable liquid polymer.

A ninth aspect according to the eighth aspect further comprises forming the solidified feedstock by selectively applying electromagnetic energy to the areas to cause the curable liquid polymer to cure.

A tenth aspect according to any of the first through fourth aspects is wherein the feedstock comprises at least 95 weight percent metal particles.

An eleventh aspect according to the tenth aspect further comprises forming the solidified feedstock by selectively applying liquid polymeric binder onto the areas and allowing or causing the liquid polymeric binder to solidify.

A twelfth aspect according any of the preceding aspects comprises: forming a multi-layer solidified feedstock composite comprising multiple layers of solidified feedstock, by: forming additional layers over the second layer, each additional layer comprising feedstock that contains metal particles; at portions of each additional layer, selectively forming solidified feedstock comprising the metal particles in solid polymer, the portions containing from 20 to 50 percent metal particles by volume, and separating the multi-layer solid body from feedstock of the layers.

A thirteenth aspect according to any of the preceding aspects is wherein the porous sintered metal body is an annular filter membrane having a shape comprising a three-dimensional tube.

A fourteenth aspect according to the thirteenth aspect is wherein the tube has a circular cross-section when viewed in a direction of an axis of the tube.

A fifteenth aspect according to the thirteenth aspect is wherein the tube has a non-circular cross-section when viewed in a direction of an axis of the tube.

A sixteenth aspect according to any of the preceding aspects, wherein the porous sintered metal body is a three-dimensional non-tubular filter membrane.

In a seventeenth aspect, a feedstock composition comprises: from 50 to 80 percent by volume curable liquid polymeric binder, and from 20 to 50 percent by volume metal particles having a relative apparent density in a range from 5 to 35 percent of a theoretical density of the particles, based on total volume of the feedstock composition.

In an eighteenth aspect, a feedstock composition comprises: solid pore-forming polymer particles, and from 20 to 50 percent by volume metal particles having a relative apparent density in a range from 5 to 35 percent of a theoretical density of the particles, based on total volume of the feedstock composition.

A nineteenth aspect according to the seventeenth or eighteenth aspect is wherein the metal particles are dendritic or fibrous and have an apparent density below 2.0 grams per cubic centimeter.

In a twentieth aspect, a porous sintered metal body is formed by an additive manufacturing method and comprises sintered metal particles, having a porosity in a range from 50 to 80 percent.

A twenty-first aspect according to the twentieth aspect is wherein the particles are dendritic particles.

A twenty-second aspect according to the twentieth aspect is wherein the particles are fibrous particles.

A twenty-third aspect according to the twentieth through the twenty-second aspects is wherein the body has a multi-layer structure that is visible using an optical microscope.

The invention claimed is:

1. A method of forming a filter membrane by additive manufacturing steps, the method comprising:
    forming a first layer on a surface;
    forming a second layer over the first layer, the first and second layers comprising a feedstock, the feedstock containing metal particles, wherein the metal particles, measured in powder form, have a relative apparent density in a range from 5 to 25 percent of a theoretical density of the particles,
    wherein the theoretical density of the particles is a mass per volume of a single particle; and
    sintering the metal particles to form a porous sintered metal body, where the porous sintered metal body is a filter membrane containing from 20 to 50 percent metal particles by volume,
    wherein forming each of the first and second layers further comprises:
    selectively solidifying the feedstock at portions of each layer to form solidified feedstock, the portions in each layer containing from 20 to 50 percent of the metal particles by volume, and
    wherein sintering the metal particles further comprises:
    sintering the metal particles of the portions of each of the first and second layers to form the porous sintered metal body.

2. The method of claim 1, wherein forming each of the first and second layers further comprises:
    separating the solidified feedstock from feedstock that remains after forming the solidified feedstock.

3. The method of claim 1, wherein the metal particles, measured in powder form, have an apparent density below 2.0 grams per cubic centimeter.

4. The method of claim 1, wherein the feedstock comprises the metal particles and pore forming polymer particles.

5. The method of claim 4, wherein selectively solidifying the feedstock further comprises selectively applying liquid polymeric binder to the portions of each layer and allowing the liquid polymeric binder to solidify into a solid polymer at the portions of each layer.

6. The method of claim 4, wherein selectively solidifying the feedstock further comprises selectively applying electromagnetic energy onto the portions of each layer to cause the pore-forming polymer particles to melt.

7. The method of claim 1, wherein the feedstock further comprises a curable liquid polymer.

8. The method of claim 7, wherein selectively solidifying the feedstock further comprises selectively applying electromagnetic energy to the portions of each layer to cause the curable liquid polymer to cure into a solid polymer at the portions of each layer.

9. The method of claim 1, wherein the feedstock comprises at least 95 weight percent metal particles.

10. The method of claim 9, wherein selectively solidifying the feedstock further comprises selectively applying liquid polymeric binder onto the portions of each layer and allowing or causing the liquid polymeric binder to solidify into a solid polymer at the portions of each layer.

11. The method of claim 1, further comprising:
    forming one or more additional layers over the second layer, each additional layer comprising the feedstock,
    wherein forming the one or more additional layers further comprises:
    selectively solidifying feedstock at portions of each additional layer to form solidified feedstock, the portions containing from 20 to 50 percent metal particles by volume, and
    separating the solidified feedstock from feedstock that remains after forming the solidified feedstock in each additional layer.

12. The method of claim 1, wherein the filter membrane is an annular filter membrane having a shape comprising a three-dimensional tube.

13. The method of claim 1, wherein the filter membrane is a three-dimensional non-tubular filter membrane.

* * * * *